United States Patent
Kim et al.

(10) Patent No.: US 10,814,840 B2
(45) Date of Patent: Oct. 27, 2020

(54) SENSOR INTEGRATION BASED PEDESTRIAN DETECTION AND PEDESTRIAN COLLISION PREVENTION APPARATUS AND METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Suk Ki Min, Suwon-si (KR); Dong Hyun Sung, Hwaseong-si (KR); In Yong Jung, Suwon-si (KR); Seung Wook Park, Yongin-si (KR); Sang Min Lee, Seoul (KR); Kang Hoon Lee, Hwaseong-si (KR); Wan Jae Lee, Suwon-si (KR); Tae Young Lee, Yongin-si (KR); Min Byeong Lee, Seongnam-si (KR); Eung Seo Kim, Suwon-si (KR); Yong Seok Kwon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 156 days.

(21) Appl. No.: 15/833,799

(22) Filed: Dec. 6, 2017

(65) Prior Publication Data

US 2018/0236985 A1 Aug. 23, 2018

(30) Foreign Application Priority Data

Dec. 30, 2016 (KR) .................. 10-2016-0184299

(51) Int. Cl.
*B60T 7/00* (2006.01)
*G06F 16/23* (2019.01)
(Continued)

(52) U.S. Cl.
CPC .............. *B60T 7/22* (2013.01); *B60Q 1/44* (2013.01); *B60Q 9/008* (2013.01); *B60T 8/171* (2013.01);
(Continued)

(58) Field of Classification Search
CPC ........ B60T 7/22; B60T 2201/022; B60T 8/17; B60T 7/18; G06F 16/2365; G06F 19/00;
(Continued)

(56) References Cited

U.S. PATENT DOCUMENTS

| 6,035,053 | A | 3/2000 | Yoshioka et al. | |
| 6,571,176 | B1 * | 5/2003 | Shinmura | B60T 7/22 180/421 |

(Continued)

FOREIGN PATENT DOCUMENTS

| DE | 102011112985 A1 | 3/2013 |
| JP | H06-107141 A | 4/1994 |

(Continued)

OTHER PUBLICATIONS

Office Action dated Feb. 21, 2019, issued in corresponding Korean Patent Application No. 10-2016-0184299.
(Continued)

*Primary Examiner* — Hunter B Lonsberry
*Assistant Examiner* — Luis A Martinez Borrero
(74) *Attorney, Agent, or Firm* — Morgan, Lewis & Bockius LLP

(57) ABSTRACT

An apparatus includes a front detection sensor detecting presence of a pedestrian on a driving lane of the vehicle, gaze information of the pedestrian, and a distance and a relative speed between the pedestrian and the vehicle; a vehicle sensor detecting at least one of a speed, an acceleration, a steering angle, a steering angular velocity, or a pressure of a master cylinder of the vehicle; an electronic
(Continued)

control unit activating a function of a pedestrian detection and collision mitigation system based on information detected by the front detection sensor and the vehicle sensor; and a warning unit operated to inform a driver of a collision of the pedestrian with the vehicle by controlling the electronic control unit.

17 Claims, 36 Drawing Sheets

(51) Int. Cl.

| | | |
|---|---|---|
| B60W 30/095 | (2012.01) | |
| B60W 30/09 | (2012.01) | |
| B60Q 1/44 | (2006.01) | |
| B60Q 9/00 | (2006.01) | |
| B60T 8/171 | (2006.01) | |
| B60T 8/172 | (2006.01) | |
| B60T 8/58 | (2006.01) | |
| G08G 1/16 | (2006.01) | |
| B60W 50/14 | (2020.01) | |
| B60T 7/22 | (2006.01) | |

(52) U.S. Cl.
CPC .............. *B60T 8/172* (2013.01); *B60T 8/58* (2013.01); *B60W 30/09* (2013.01); *B60W 30/0953* (2013.01); *B60W 30/0956* (2013.01); *G06F 16/2365* (2019.01); *G08G 1/166* (2013.01); *B60T 2201/024* (2013.01); *B60T 2210/32* (2013.01); *B60T 2220/03* (2013.01); *B60W 2050/143* (2013.01); *B60W 2050/146* (2013.01); *B60W 2420/40* (2013.01); *B60W 2420/42* (2013.01); *B60W 2420/52* (2013.01); *B60W 2510/182* (2013.01); *B60W 2520/10* (2013.01); *B60W 2520/105* (2013.01); *B60W 2540/18* (2013.01); *B60W 2554/00* (2020.02); *B60W 2555/20* (2020.02); *B60W 2710/182* (2013.01); *B60W 2720/10* (2013.01)

(58) Field of Classification Search
CPC .... G06F 16/24568; G06F 21/44; G06F 21/57; G06F 16/00; G06F 16/29; G06F 16/51; G06F 9/4881; B60Q 1/44; B60Q 9/008
See application file for complete search history.

(56) References Cited

U.S. PATENT DOCUMENTS

| | | | | |
|---|---|---|---|---|
| 7,737,833 B2* | 6/2010 | Takafuji | ............. | B60R 21/0132 180/274 |
| 8,725,309 B2* | 5/2014 | Kubotani | ............... | G08G 1/166 340/901 |
| 9,168,867 B2* | 10/2015 | Tamatsu | ................. | G08G 1/005 |
| 9,336,436 B1* | 5/2016 | Dowdall | ............ | G06K 9/00362 |
| 9,449,506 B1* | 9/2016 | Whiting | ............. | G06K 9/00369 |
| 9,493,118 B1* | 11/2016 | Laur | .................... | B60W 50/16 |
| 9,507,998 B2* | 11/2016 | Ogawa | ................... | G08G 1/166 |
| 9,718,405 B1* | 8/2017 | Englander | ............ | B60K 35/00 |
| 9,925,980 B2* | 3/2018 | Edo-Ros | ........... | B60W 30/0953 |
| 10,347,132 B1* | 7/2019 | Chandrakumar | ...... | G08G 1/005 |
| 10,435,018 B2* | 10/2019 | Kim | .................. | B60W 30/0956 |
| 2006/0278461 A1* | 12/2006 | Shen | .................... | B60R 21/0134 180/274 |
| 2007/0152804 A1 | 7/2007 | Breed et al. | | |
| 2008/0136613 A1* | 6/2008 | Takafuji | .............. | B60R 21/0136 340/436 |
| 2009/0187321 A1* | 7/2009 | Otsuka | ...................... | B60T 7/22 701/70 |
| 2009/0252380 A1* | 10/2009 | Shimizu | ................. | G08G 1/163 382/107 |
| 2010/0076621 A1* | 3/2010 | Kubotani | ............... | G08G 1/166 701/1 |
| 2011/0125372 A1* | 5/2011 | Ito | ........................... | G08G 1/166 701/45 |
| 2012/0300078 A1* | 11/2012 | Ogata | ................ | G06K 9/00362 348/148 |
| 2014/0112538 A1* | 4/2014 | Ogawa | ...................... | G06T 7/20 382/103 |
| 2014/0129001 A1* | 5/2014 | Staudenmaier | ......... | B60R 21/00 700/79 |
| 2016/0016560 A1 | 1/2016 | Parker et al. | | |
| 2016/0075332 A1* | 3/2016 | Edo-Ros | ................... | B60T 7/22 701/70 |
| 2016/0109566 A1* | 4/2016 | Liu | ....................... | G01S 13/867 342/52 |
| 2016/0375900 A1* | 12/2016 | Laur | .............. | B60W 30/18163 701/41 |
| 2017/0320473 A1* | 11/2017 | Ohbayashi | ............. | G08G 1/166 |
| 2018/0012492 A1* | 1/2018 | Baldwin | .............. | G05D 1/0261 |
| 2018/0186349 A1* | 7/2018 | Kim | ........................ | B60T 7/22 |
| 2018/0186368 A1* | 7/2018 | Kim | .................. | G06K 9/00369 |
| 2018/0215378 A1* | 8/2018 | Edo Ros | ............ | B60T 8/17558 |
| 2018/0236986 A1* | 8/2018 | Kim | ........................ | B60T 8/171 |
| 2019/0071074 A1* | 3/2019 | Gokan | ................. | G05D 1/0257 |

FOREIGN PATENT DOCUMENTS

| | | |
|---|---|---|
| JP | 2005-182452 A | 7/2005 |
| JP | 2006-163637 A | 6/2006 |
| JP | 2008-143372 A | 6/2008 |
| JP | 2010-127717 A | 6/2010 |
| JP | 2011-063187 A | 3/2011 |
| JP | 2011-225159 A | 11/2011 |
| JP | 2014-059841 A | 4/2014 |
| JP | 2015-031607 A | 2/2015 |
| JP | 2016-009251 A | 1/2016 |
| KR | 10-1402206 B1 | 5/2014 |
| KR | 10-1489836 B1 | 2/2015 |

OTHER PUBLICATIONS

Korean Office Action dated Sep. 3, 2018 issued in Korean Patent Application No. 10-2016-0184299.
Extended European Search Report issued in Application No. 17205392.8 dated Jun. 1, 2018.

* cited by examiner

[Fig. 1]
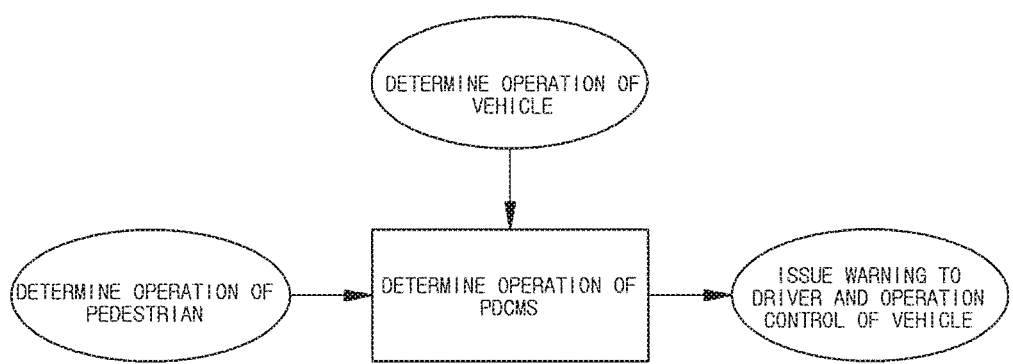
[Fig. 2]
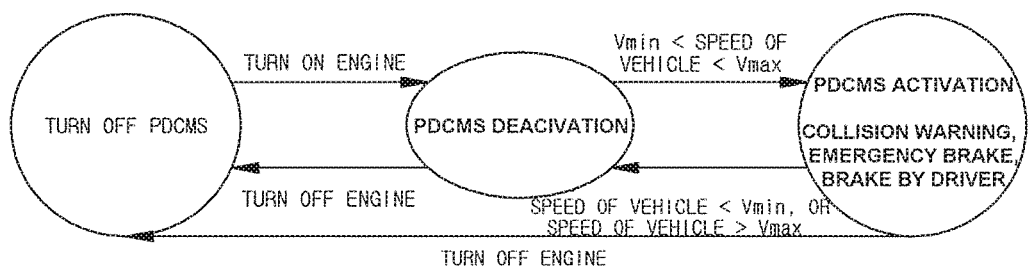

[Fig. 3]
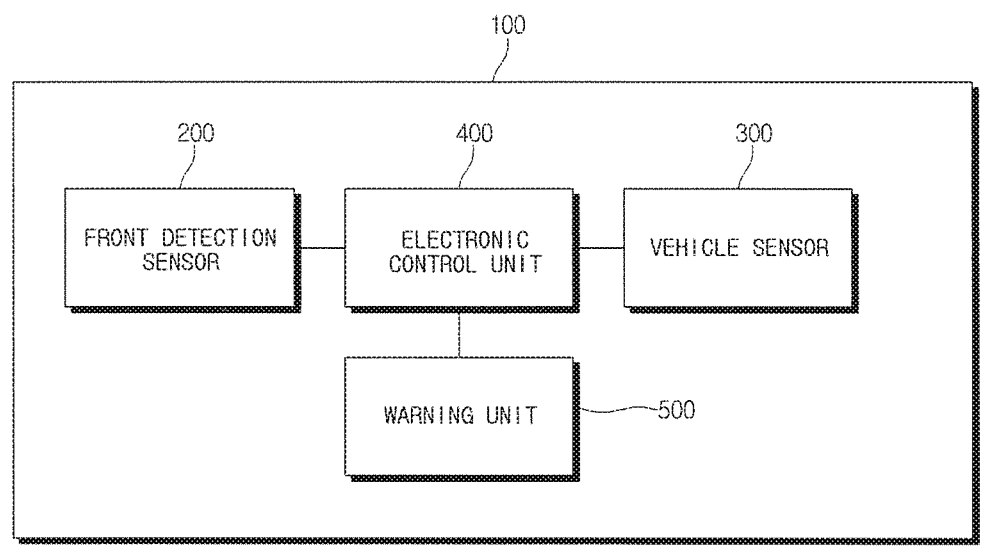

[Fig. 4]
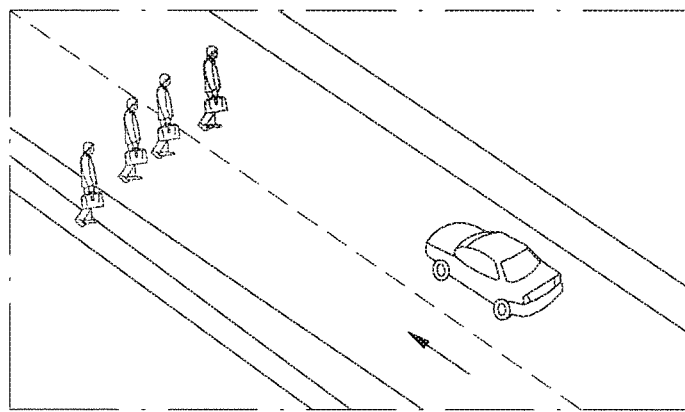
CVFA
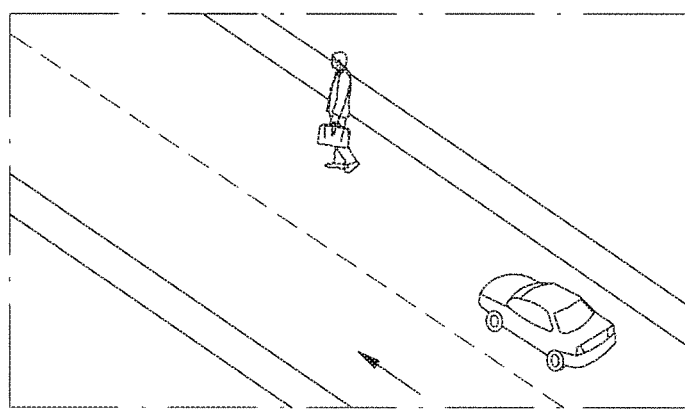
CVNA
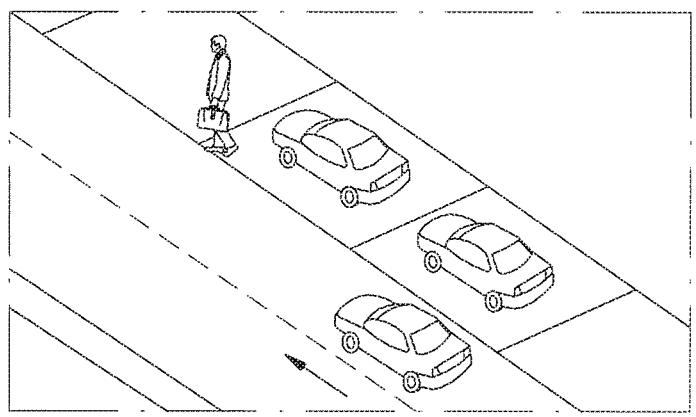
CVNC

[Fig. 5]
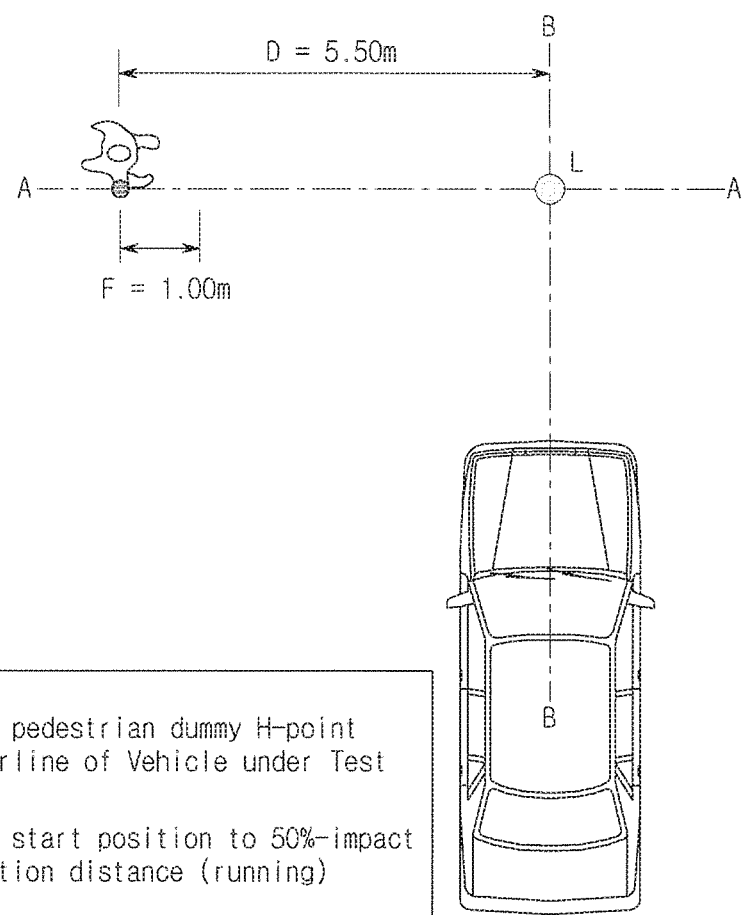

[Fig. 6]
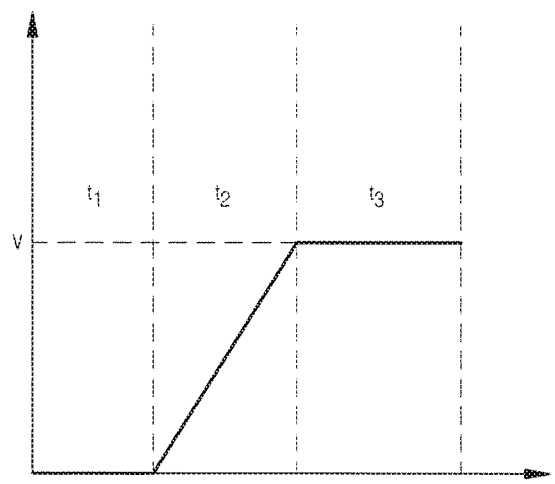

[Fig. 7A]
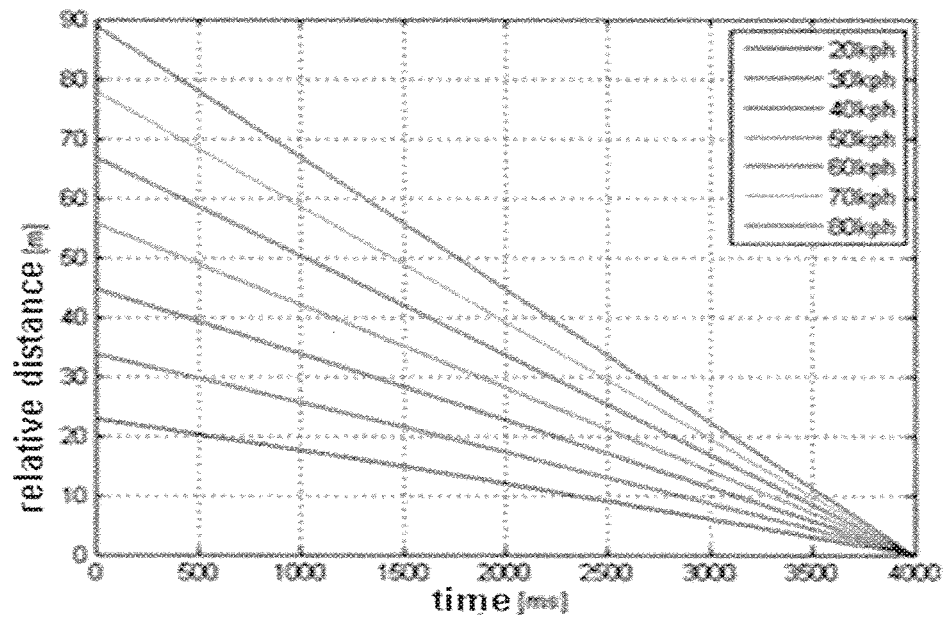
[Fig. 7B]
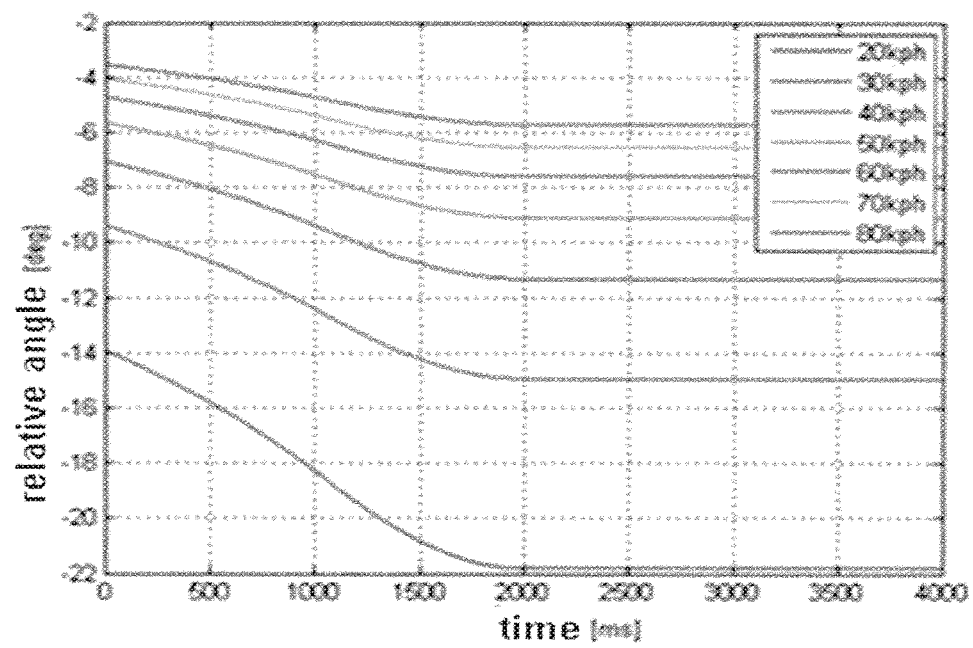

[Fig. 7C]
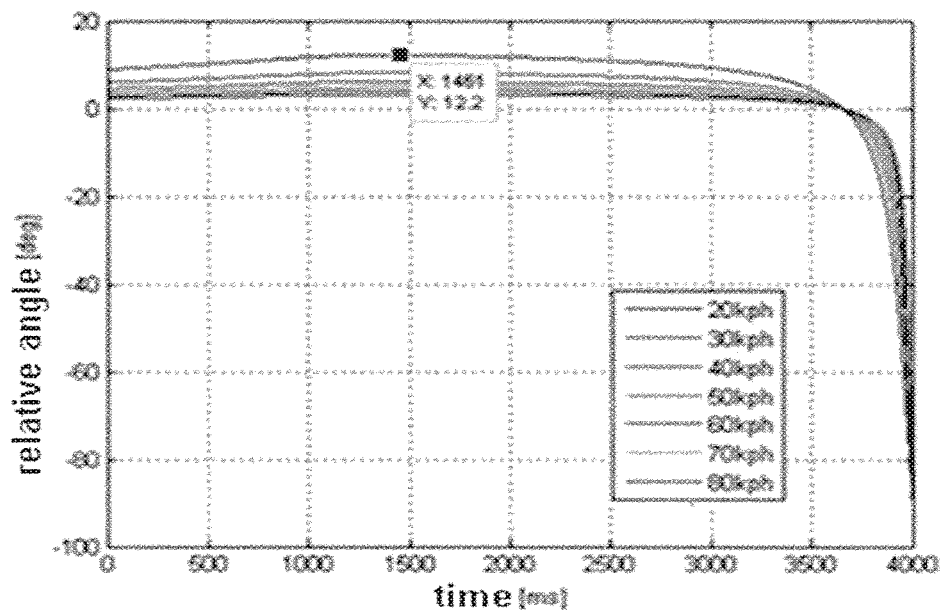
[Fig. 7D]
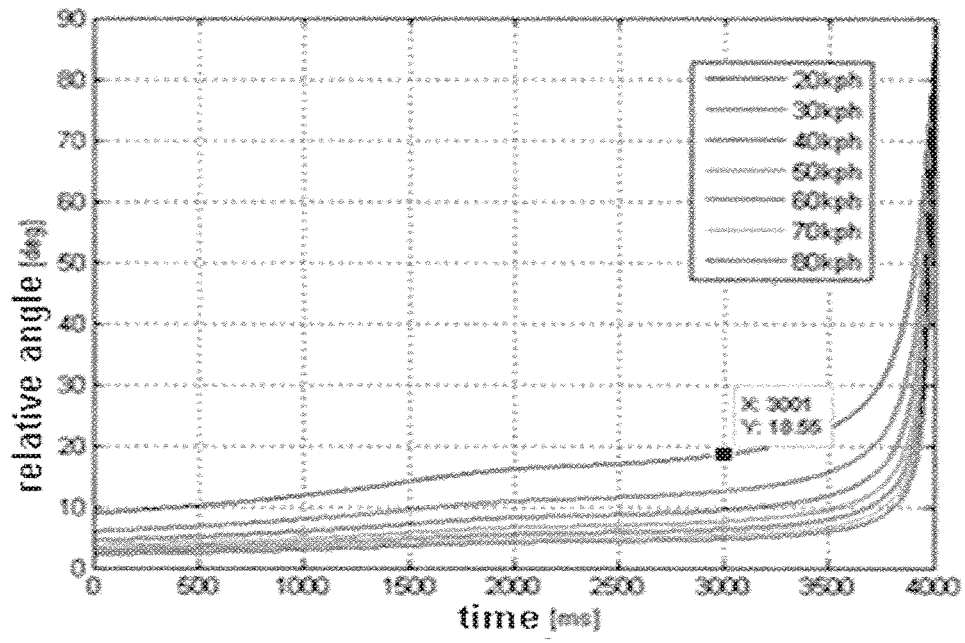

[Fig. 7E]
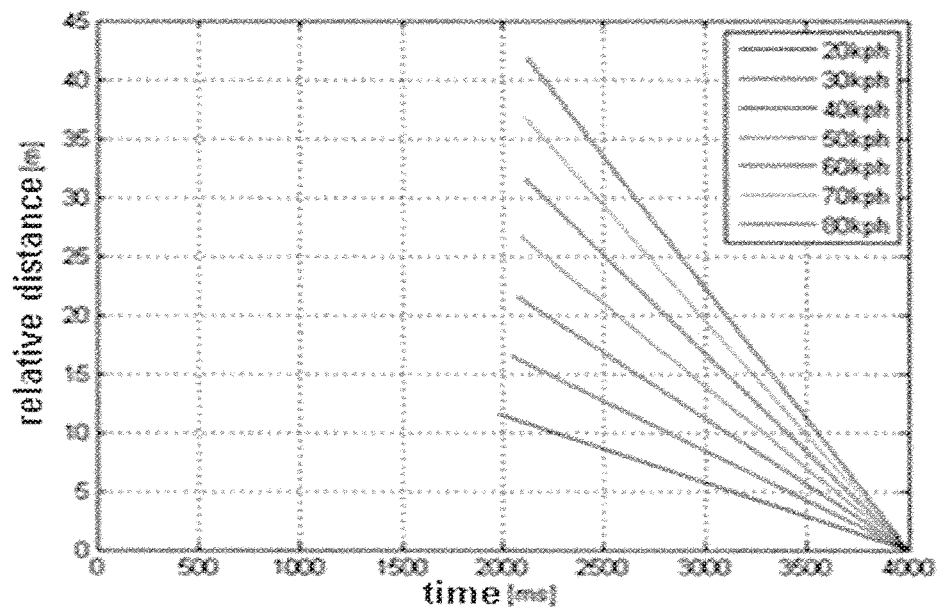
[Fig. 7F]
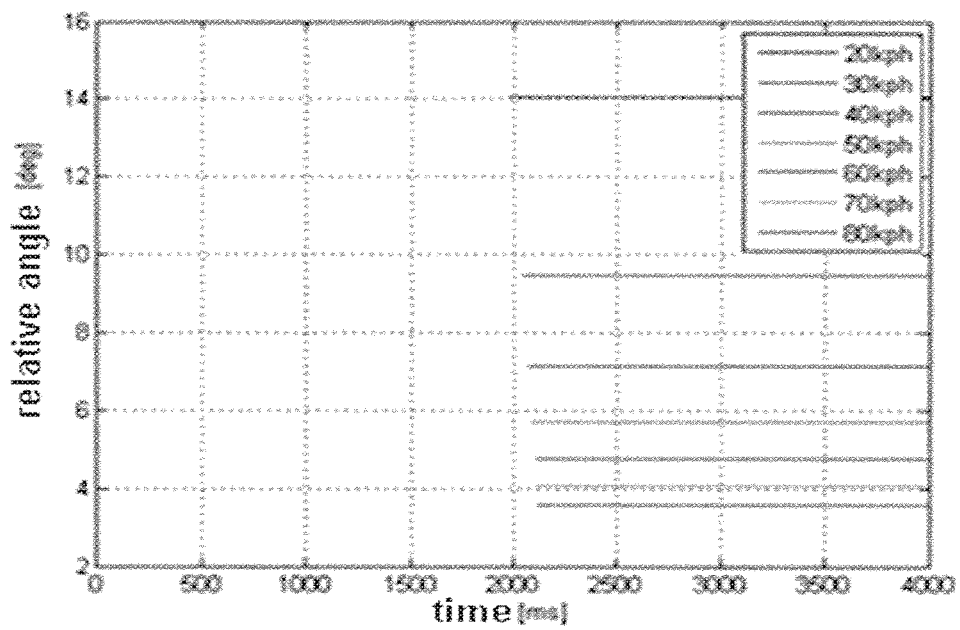

[Fig. 8]
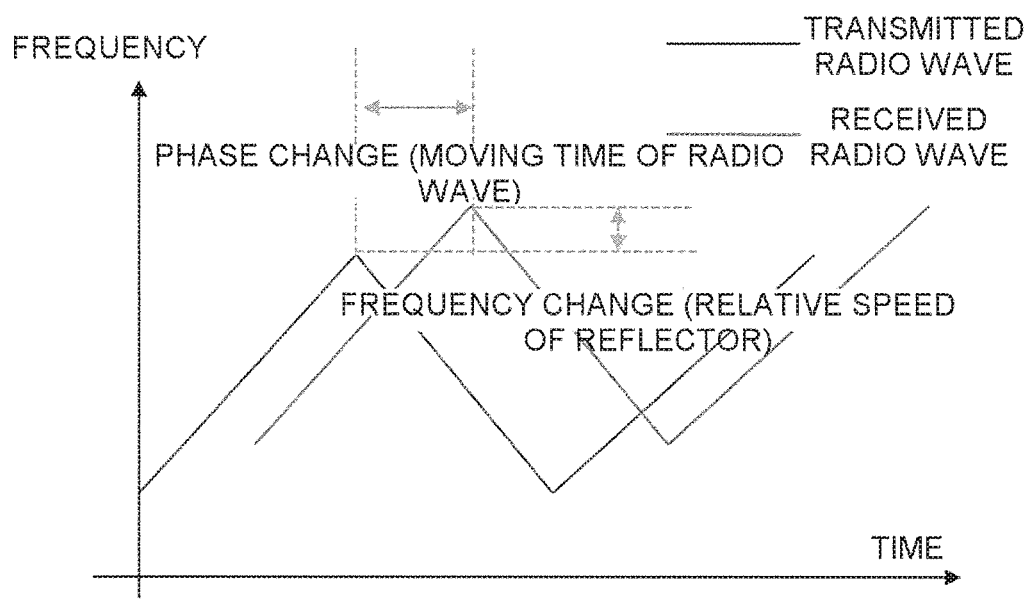
[Fig. 9]
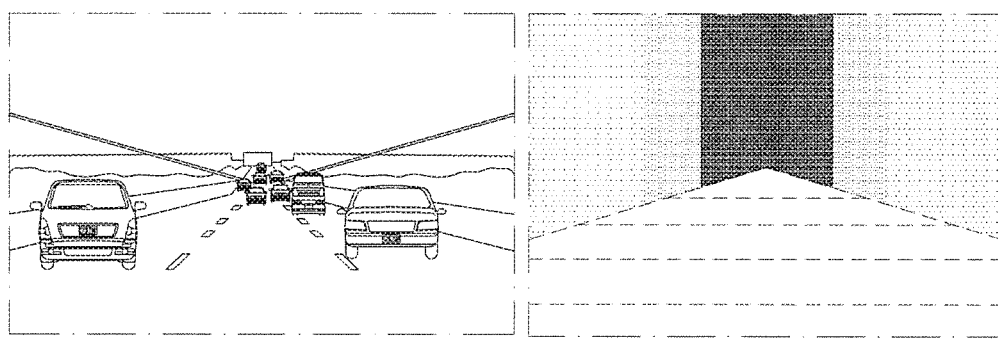

[Fig. 10A]
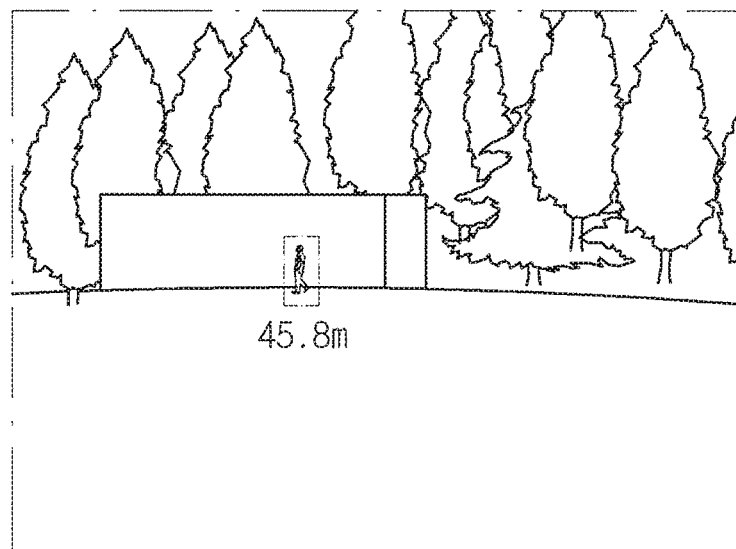
[Fig. 10B]
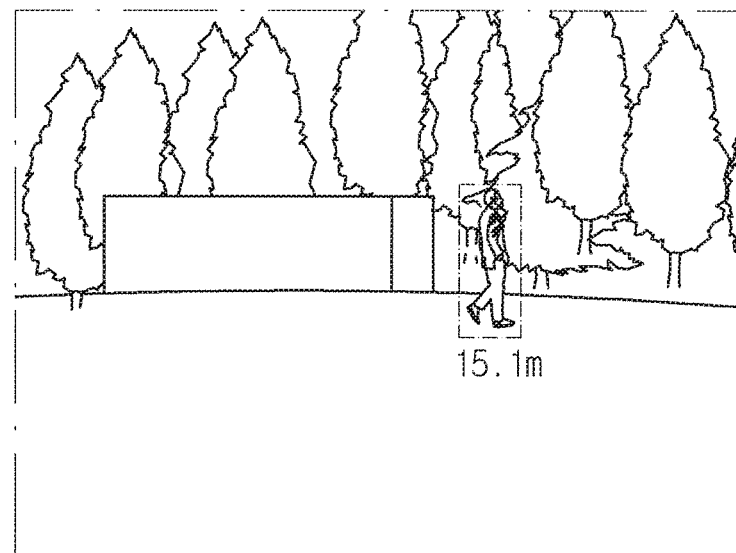

[Fig. 11]
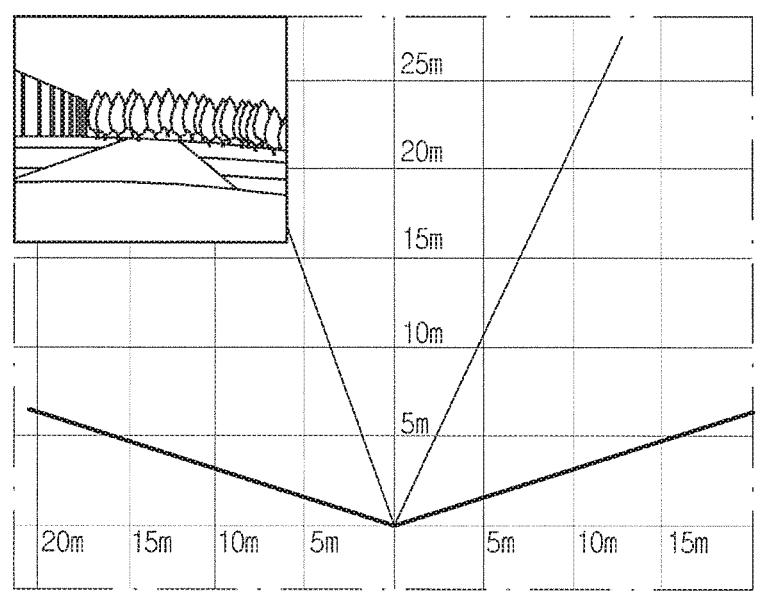

[Fig. 12A]
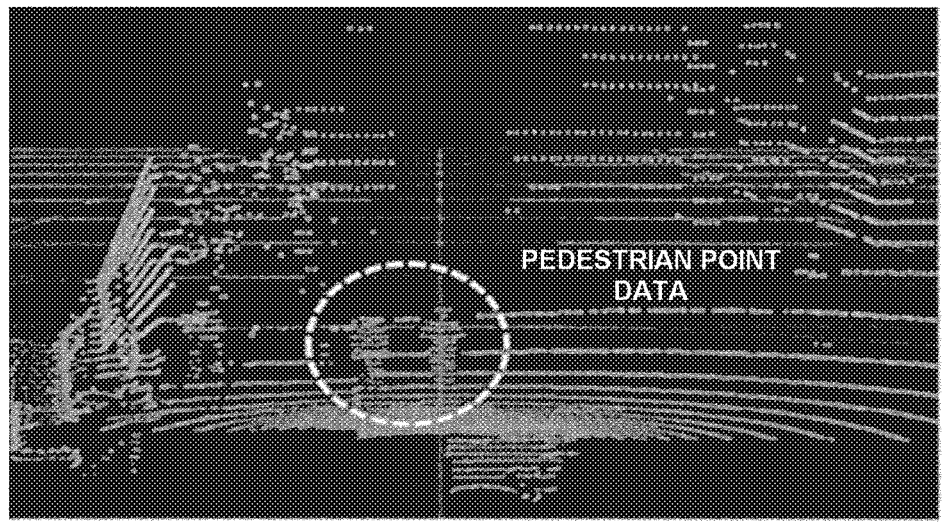
[Fig. 12B]
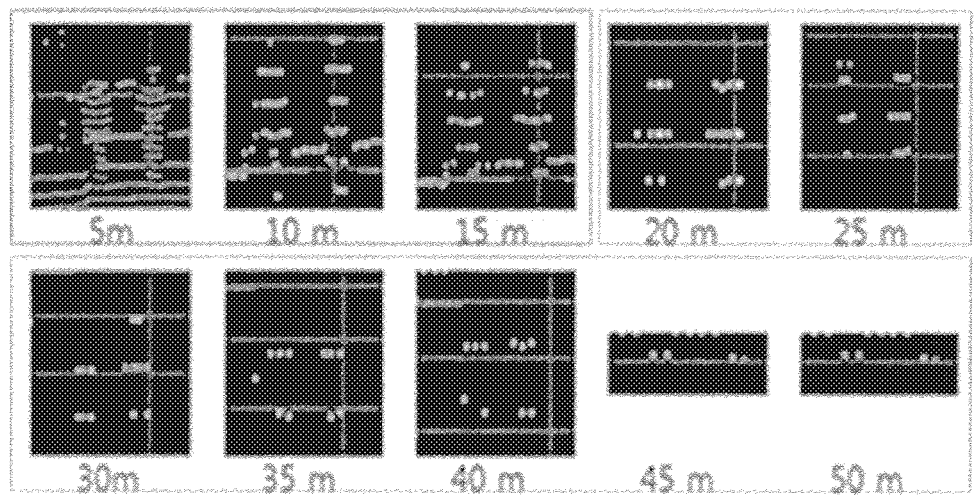

[Fig. 13]
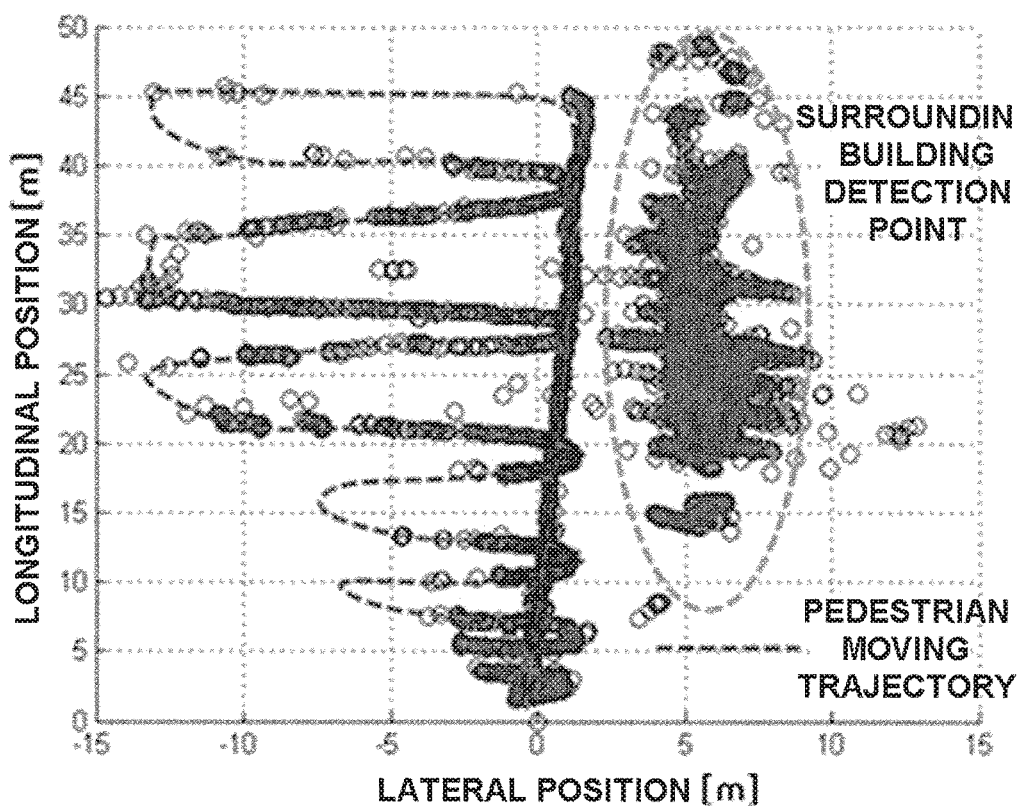

[Fig. 14]
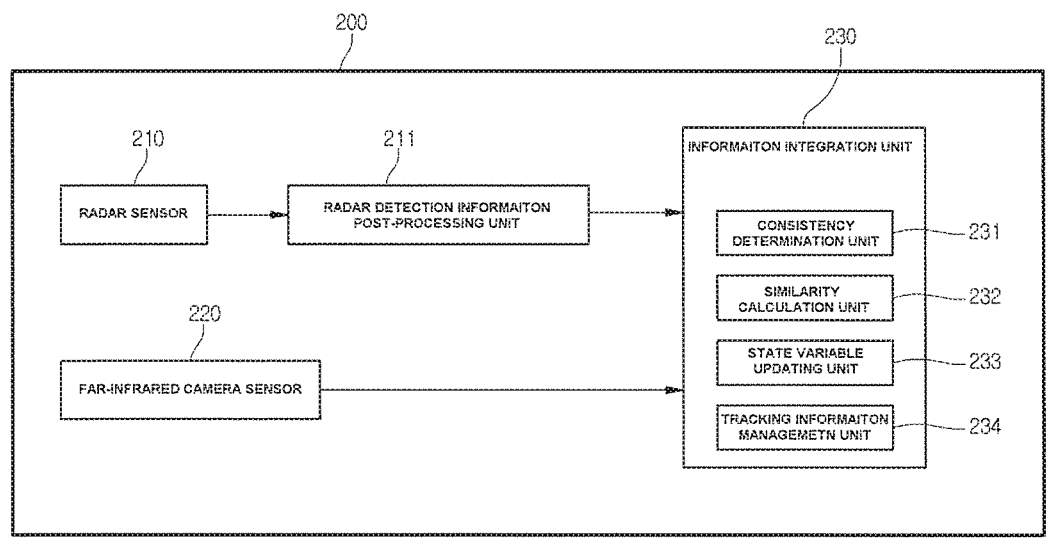
[Fig. 15A]
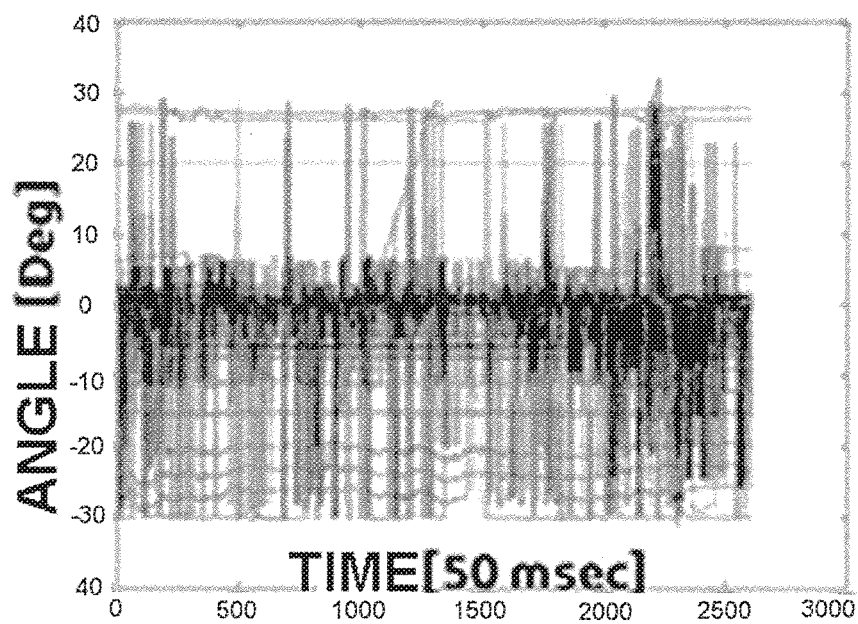

[Fig. 15B]
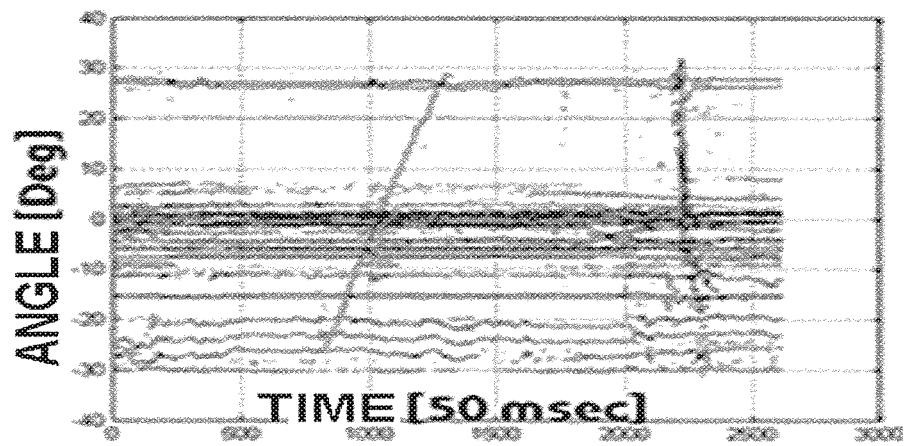
[Fig. 15C]
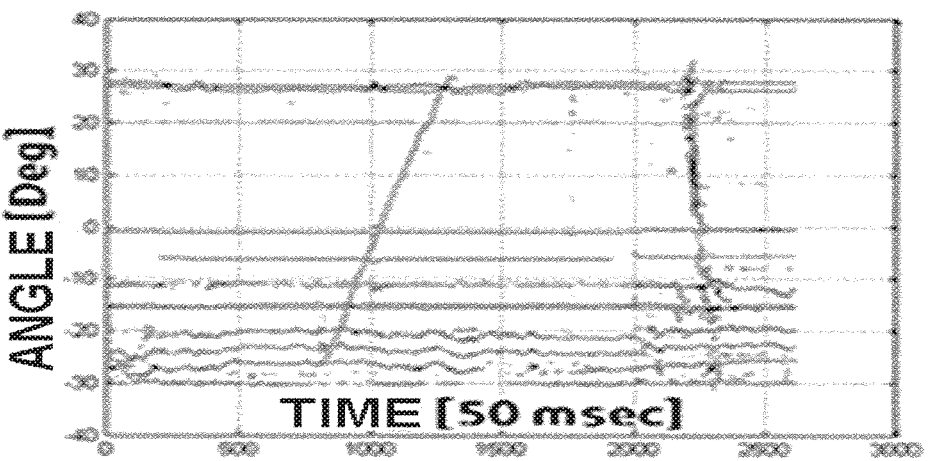

[Fig. 15D]
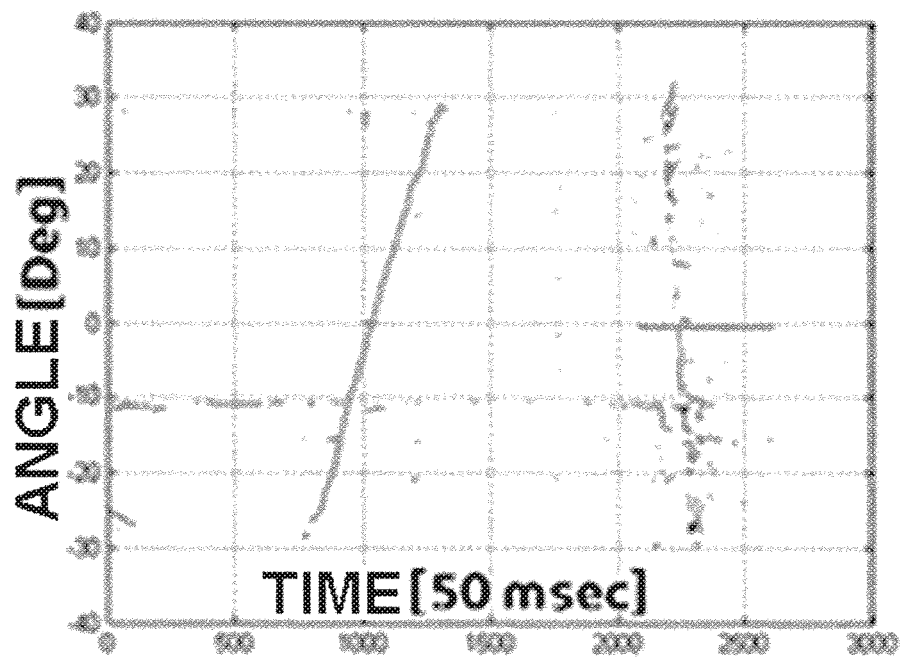

[Fig. 16]
[Fig. 17A]
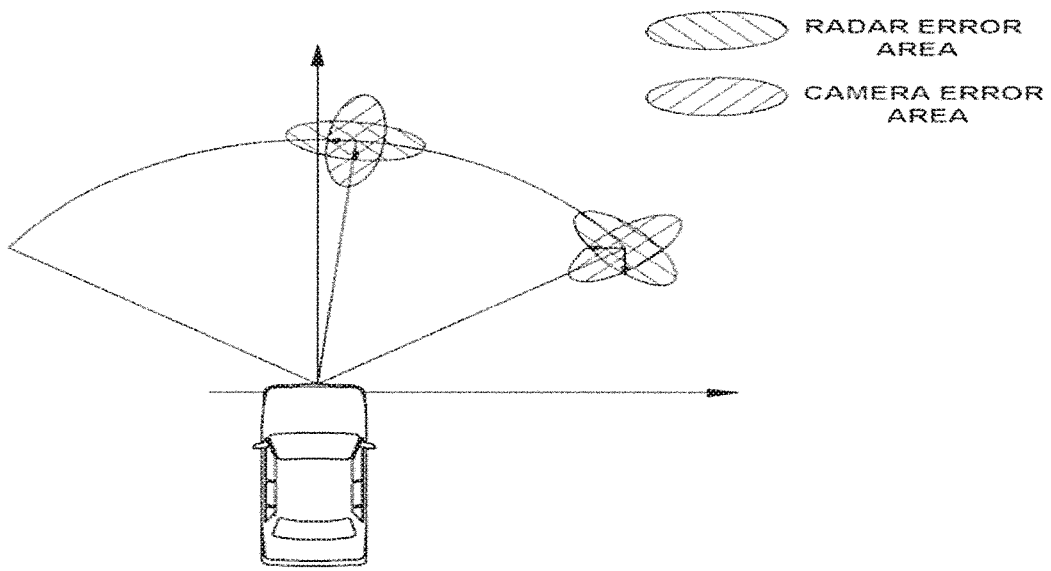

[Fig. 17B]
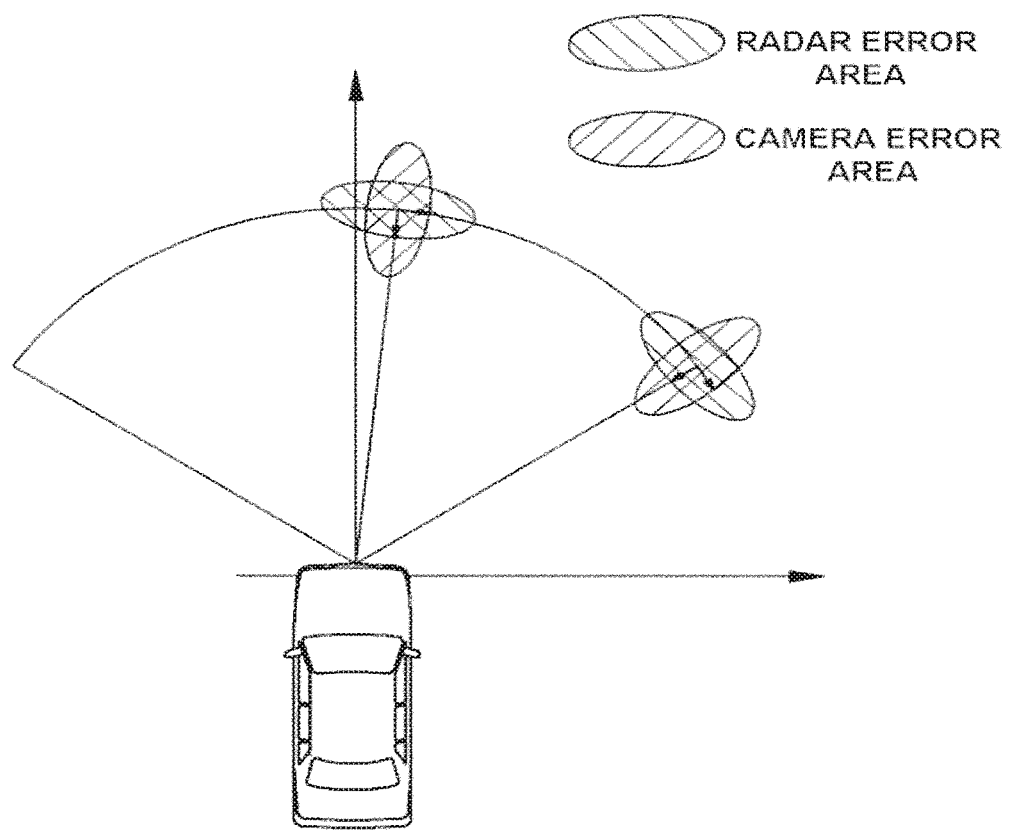

[Fig. 18A]
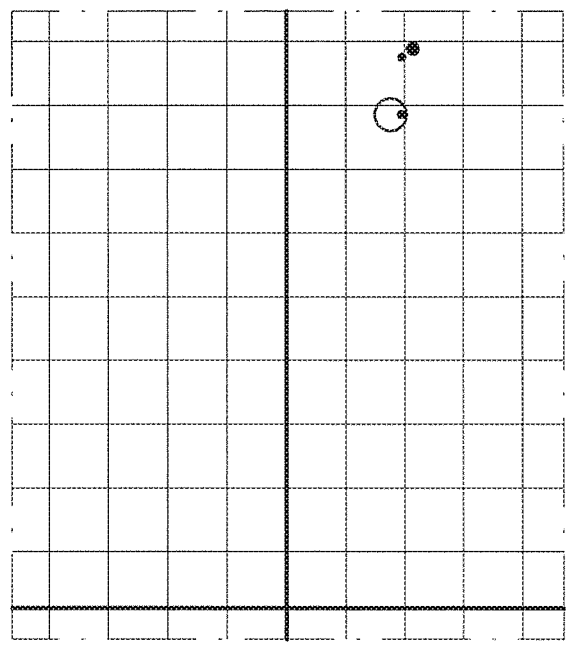
[Fig. 18B]
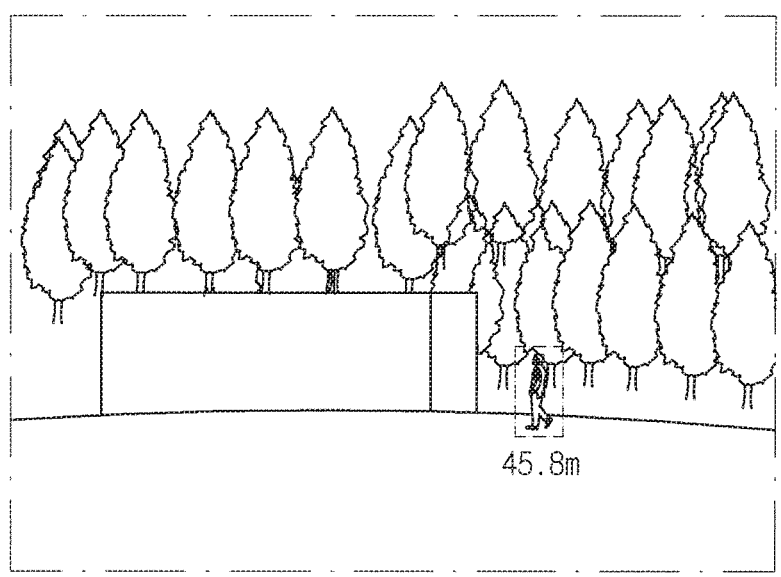

[Fig. 18C]
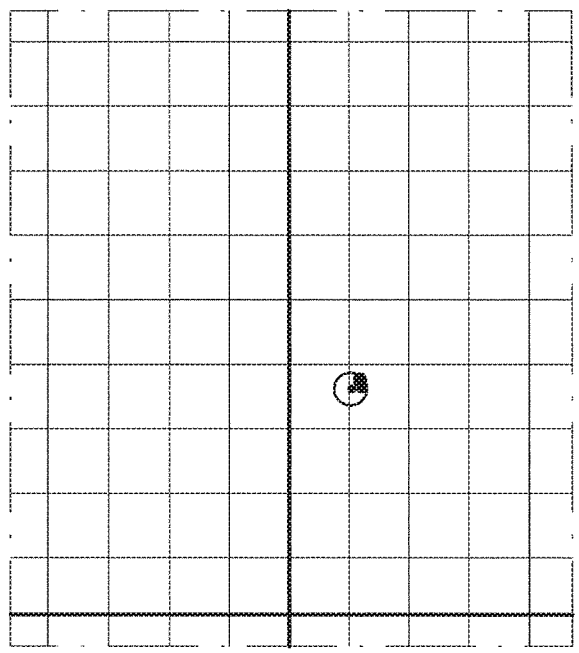
[Fig. 18D]
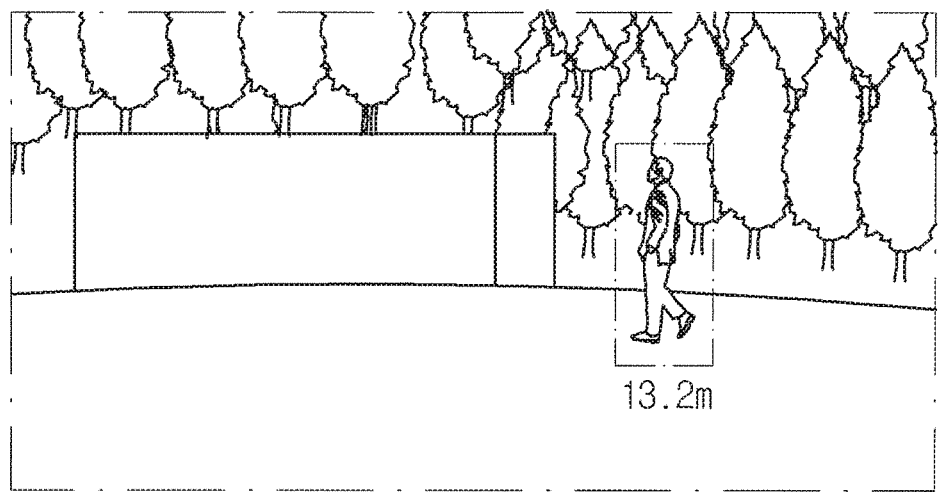

[Fig. 18E]
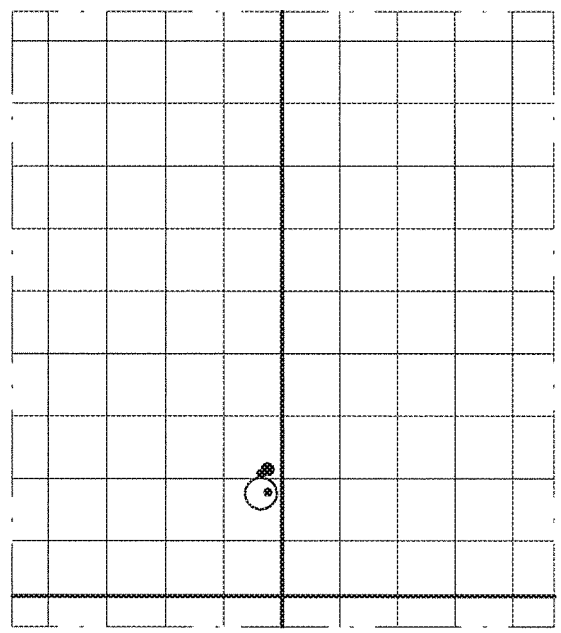
[Fig. 18F]
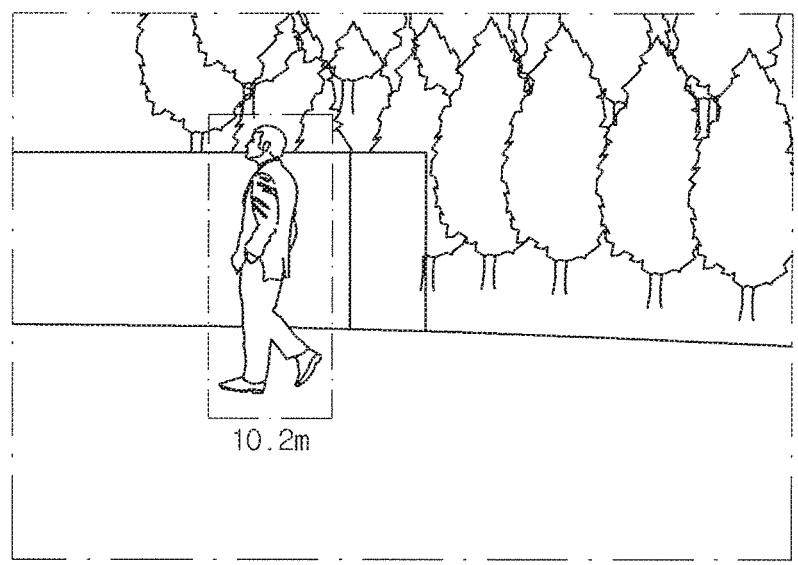

[Fig. 19]
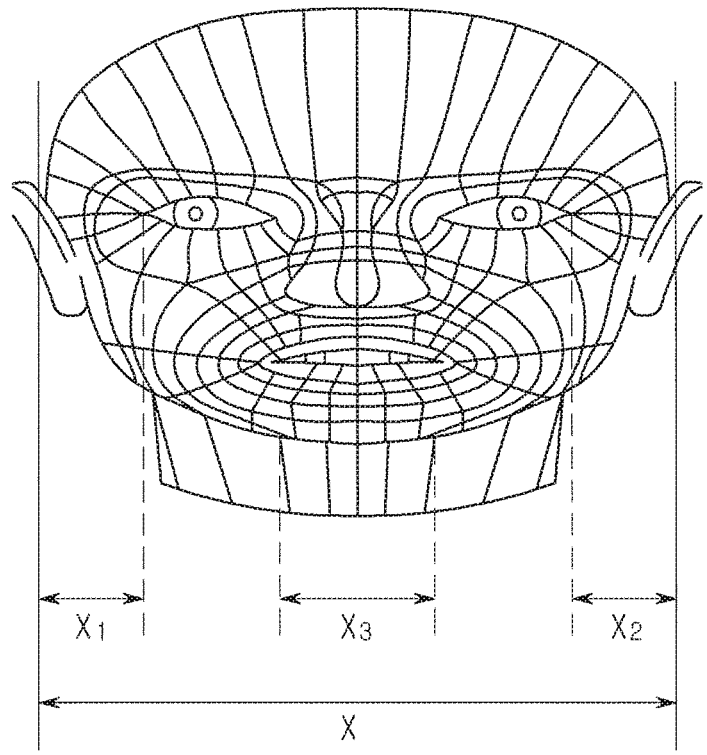
[Fig. 20]
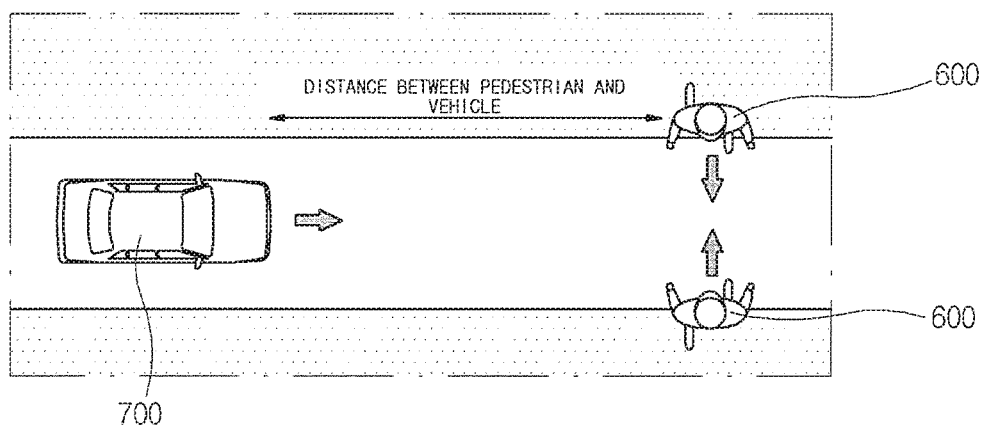

[Fig. 21]
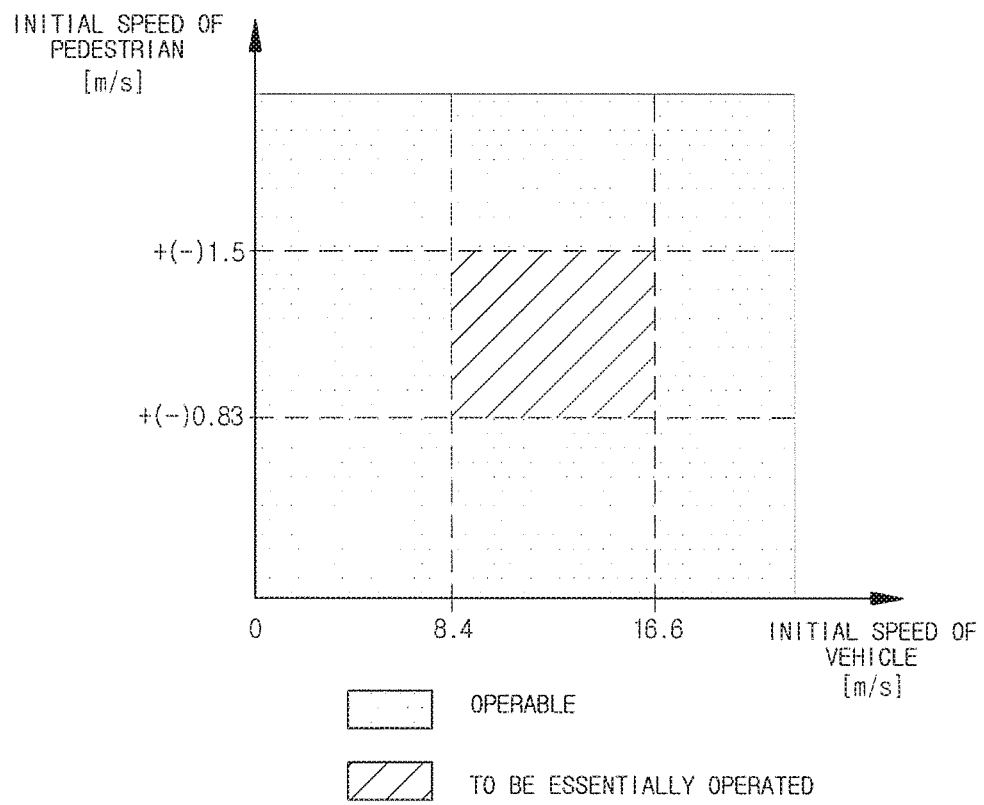
[Fig. 22]
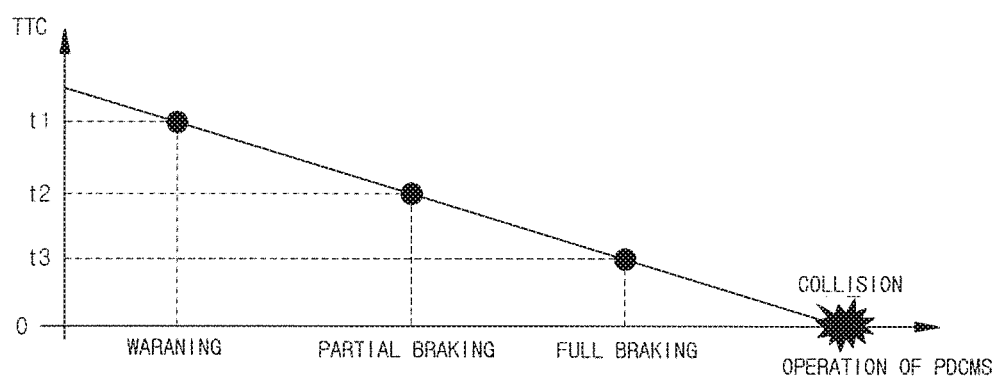

[Fig. 23A]
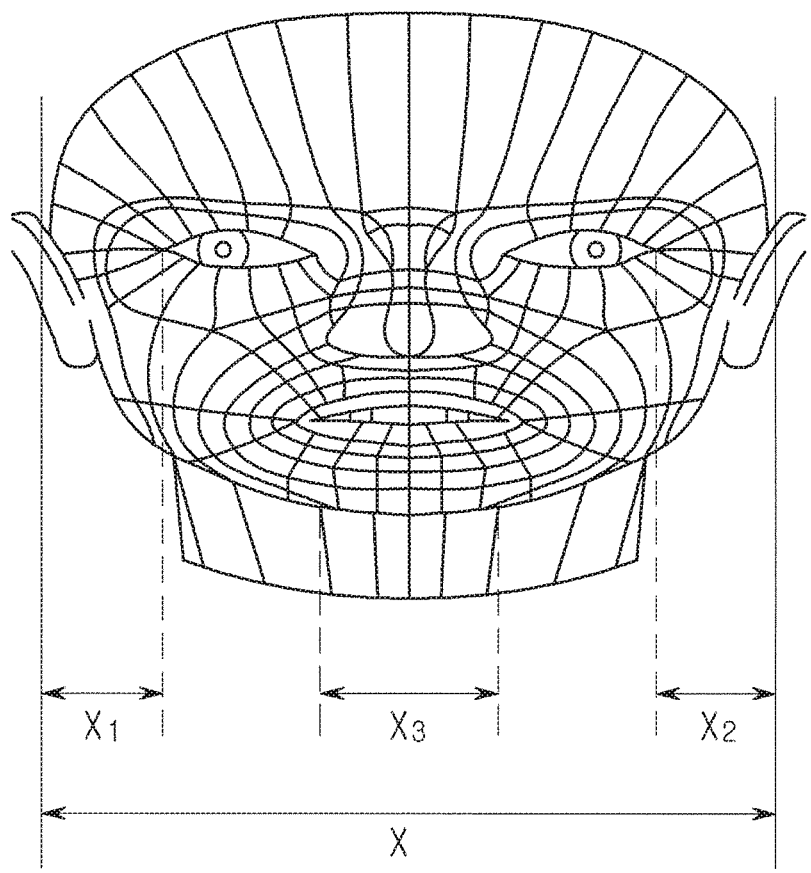

[Fig. 23B]
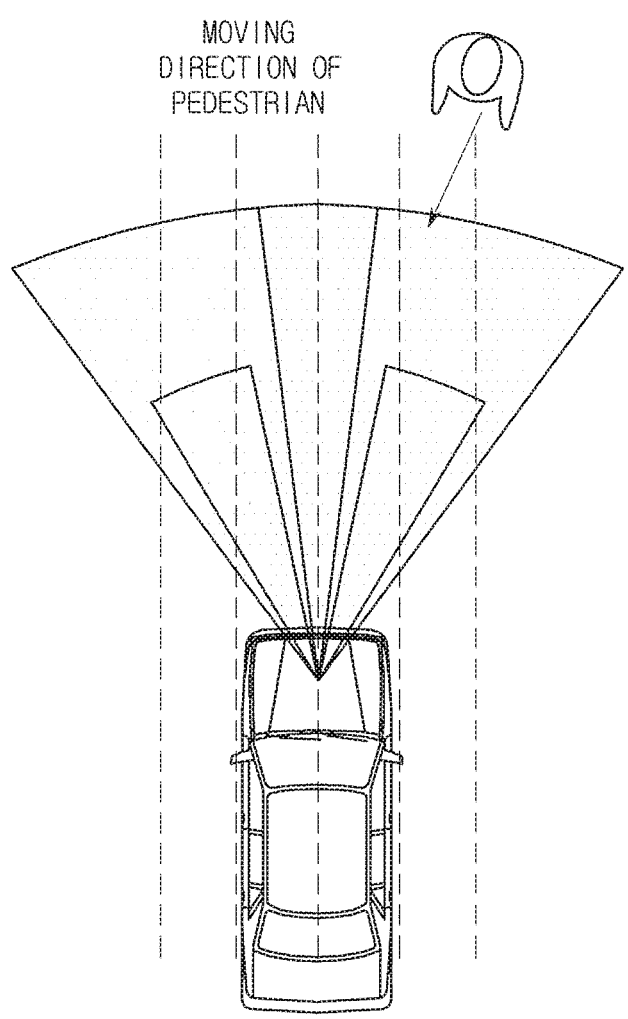

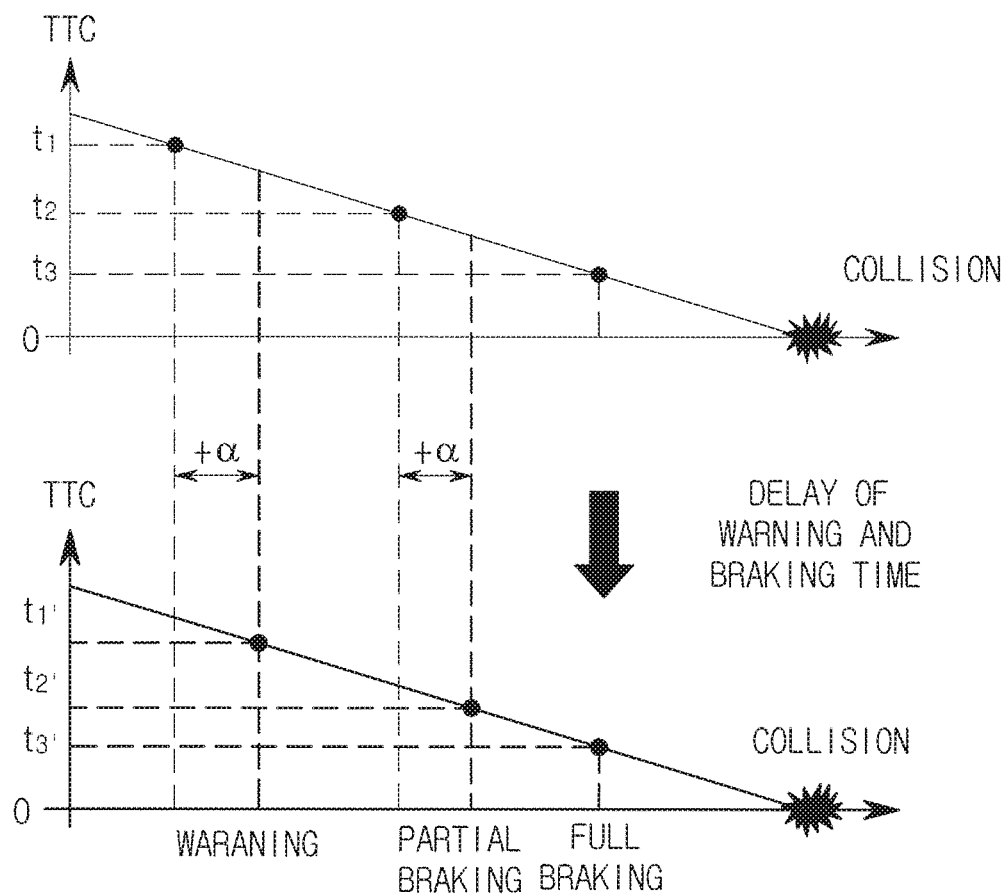
[Fig. 23C]

[Fig. 24A]
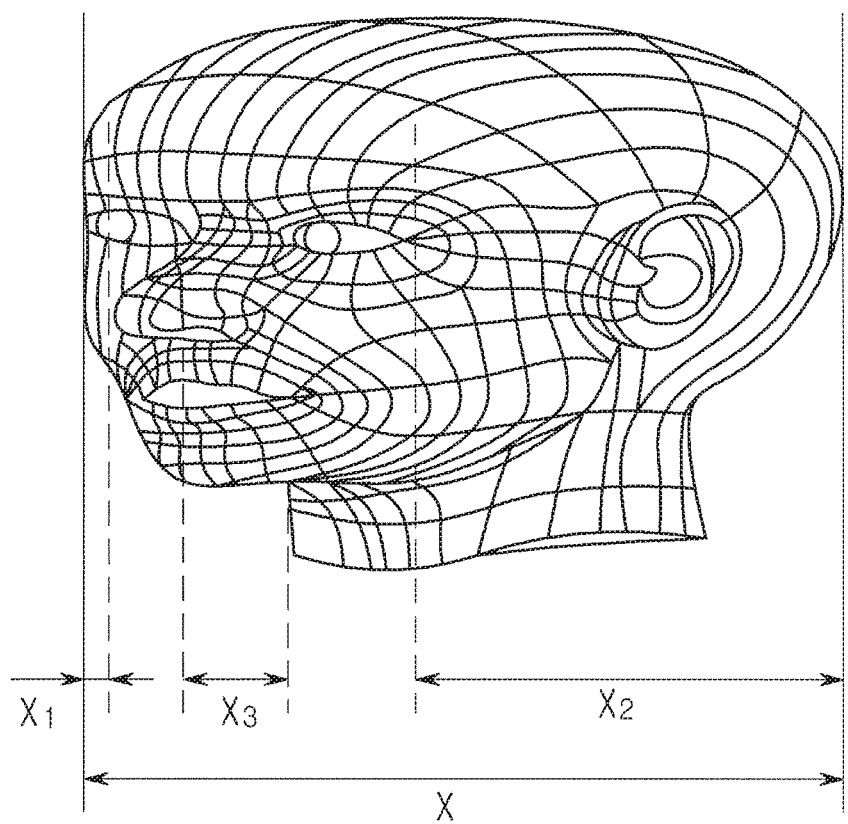

[Fig. 24B]
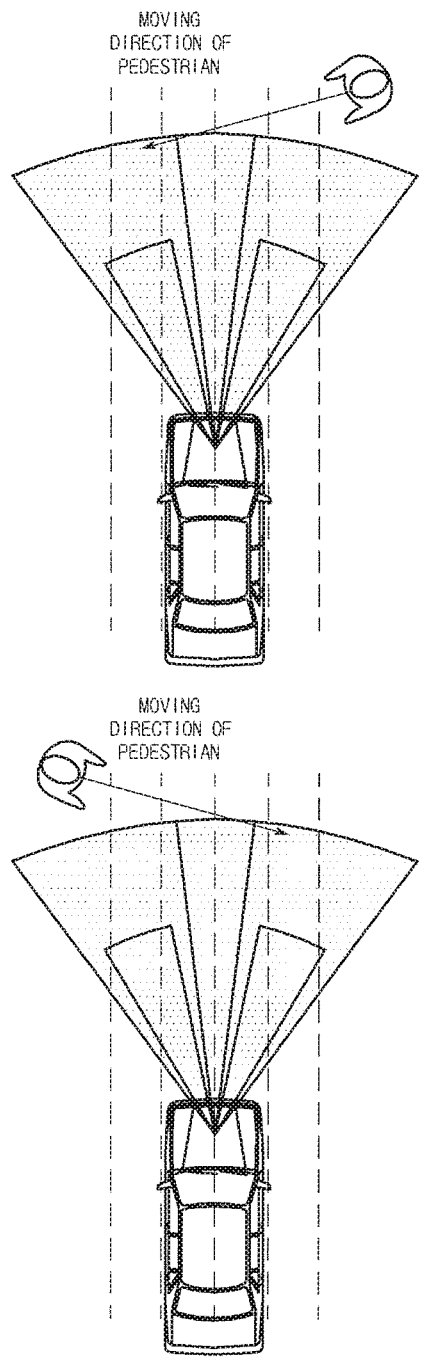

[Fig. 24C]
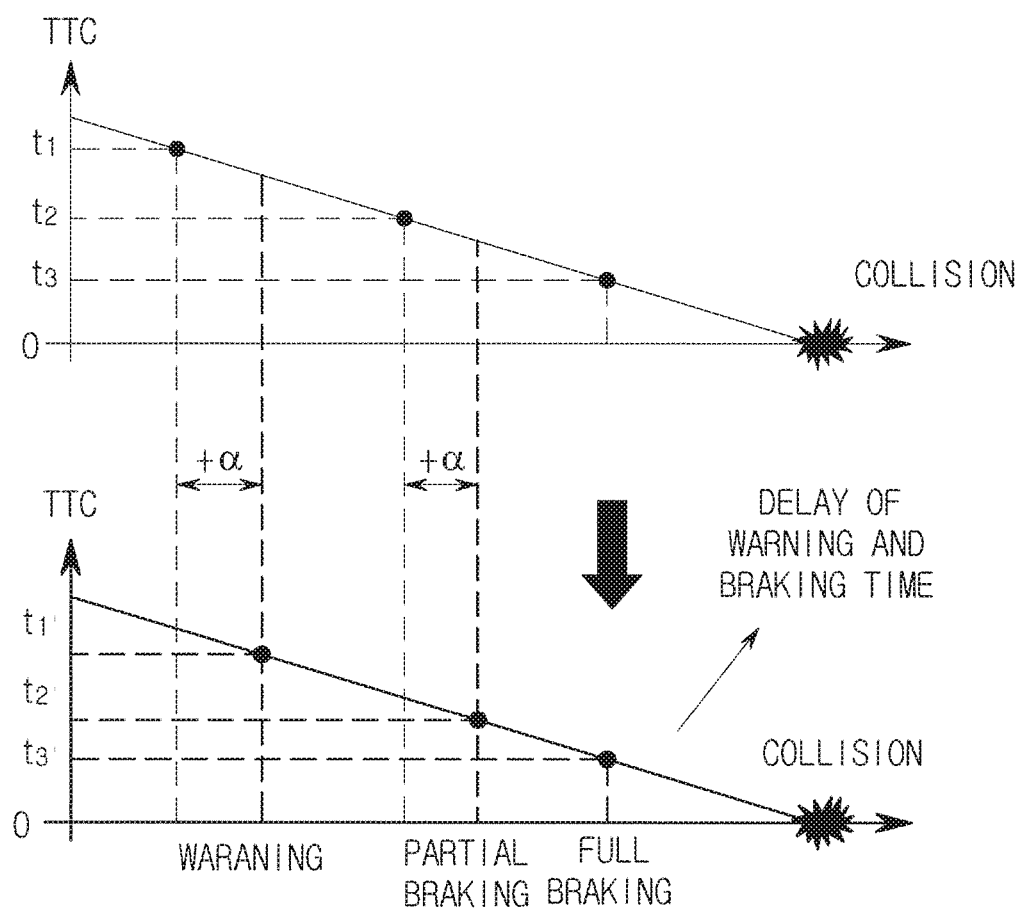

[Fig. 25A]
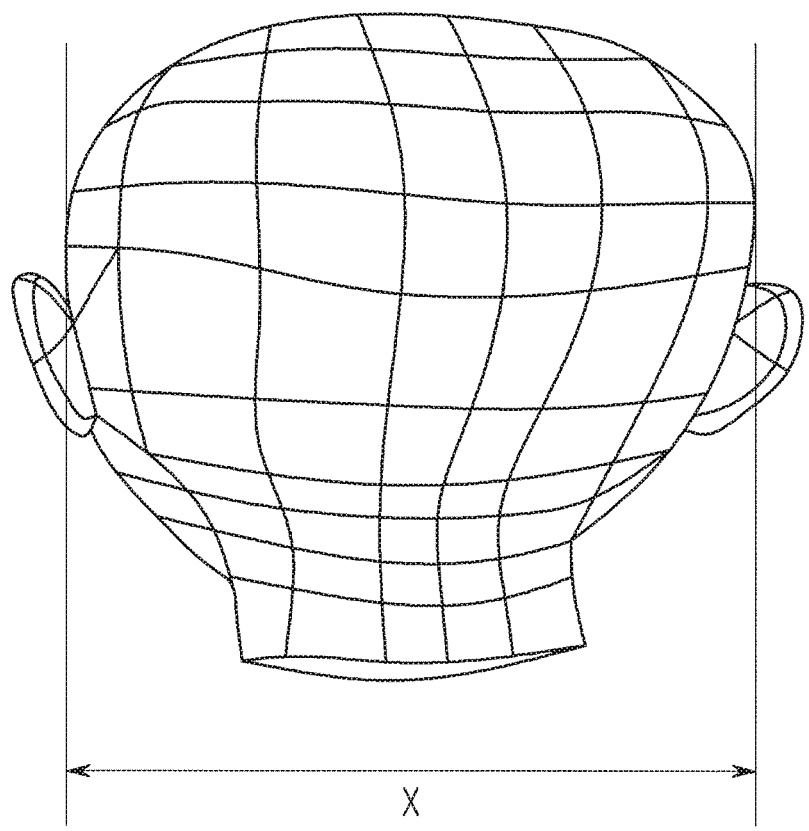

[Fig. 25B]
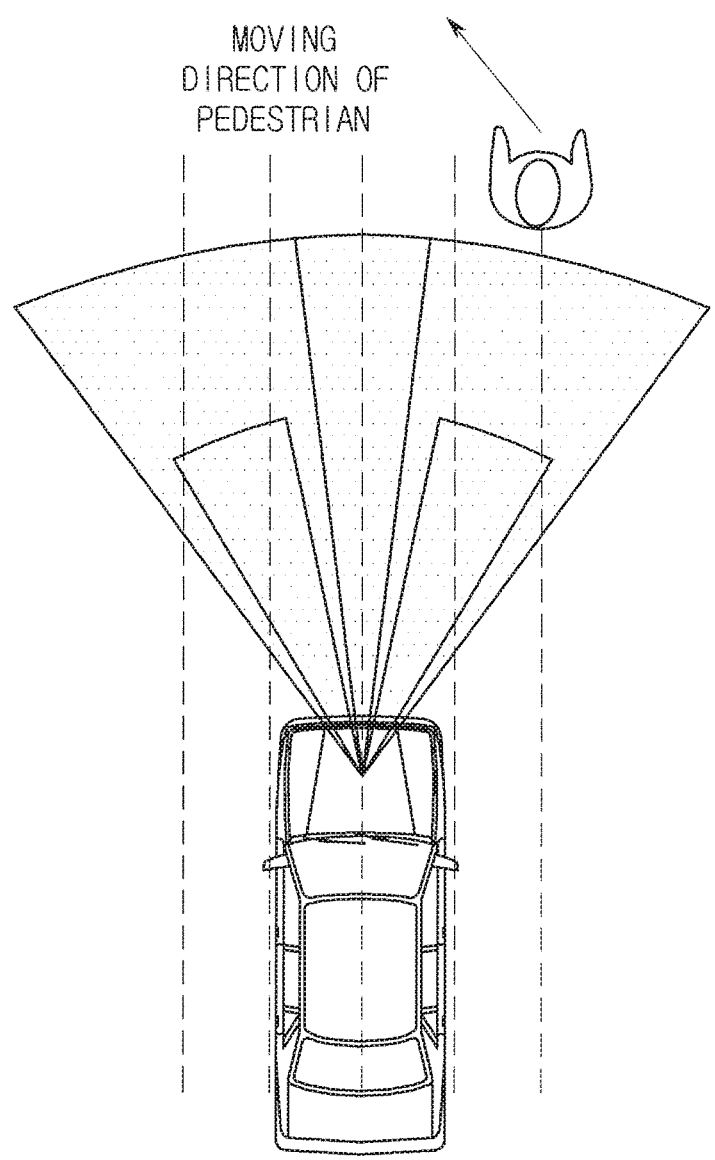

[Fig. 25C]
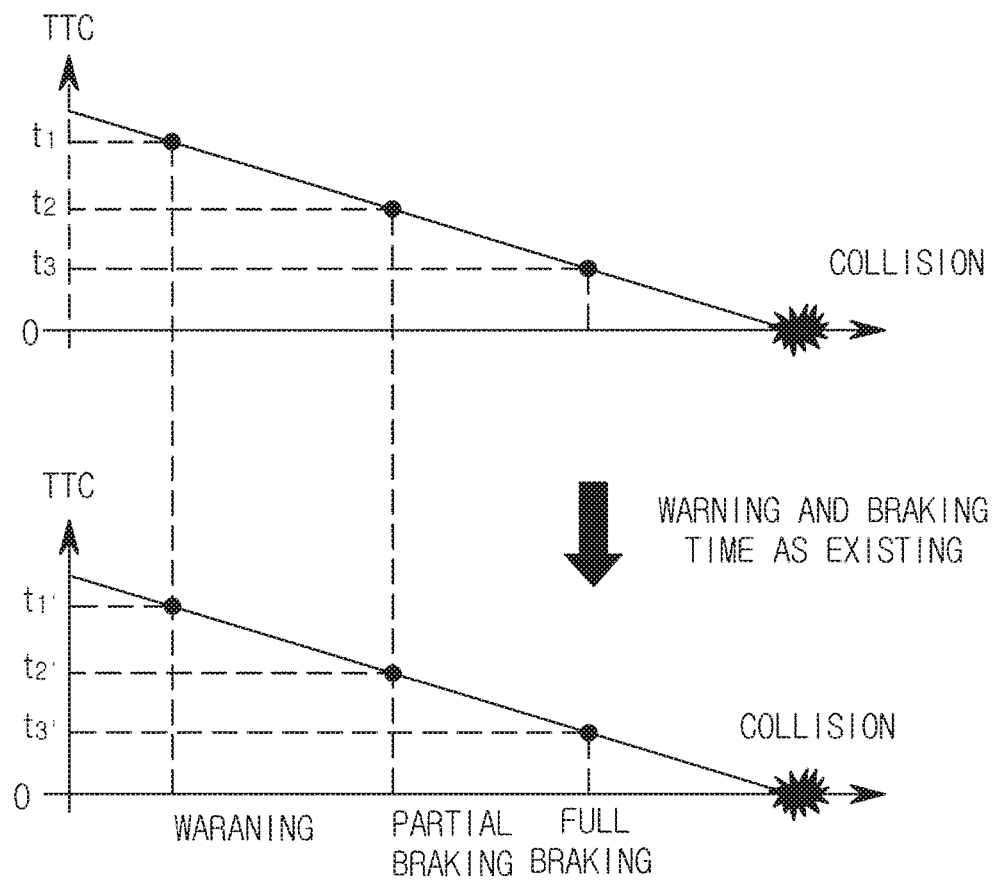

[Fig. 26A]
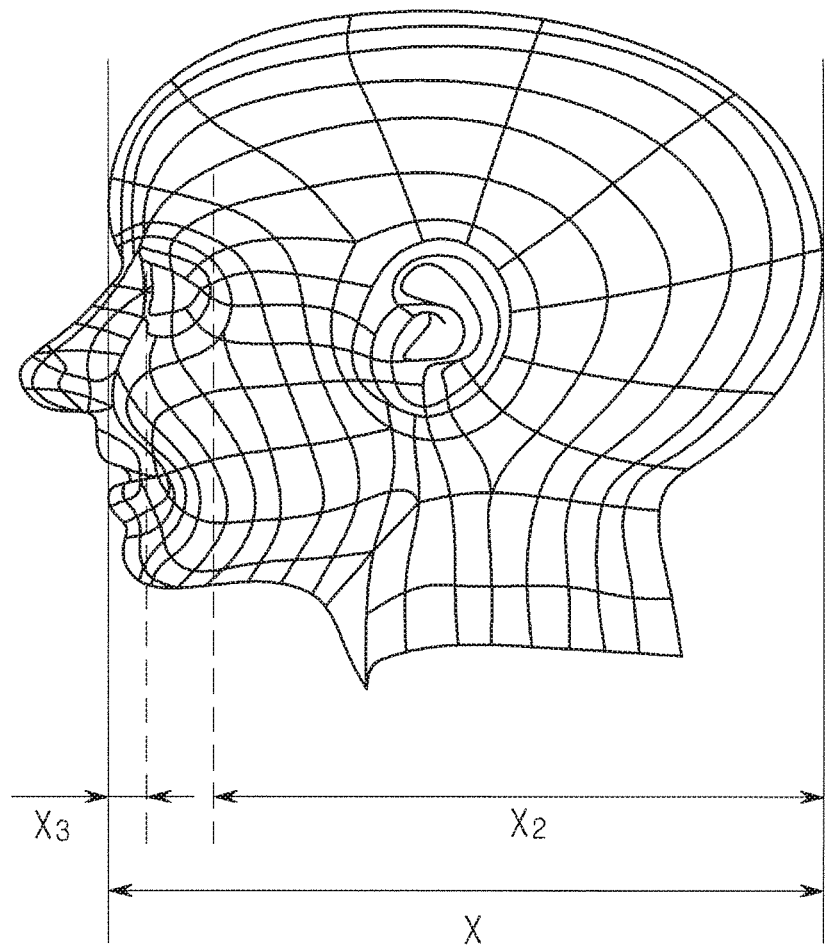

[Fig. 26B]
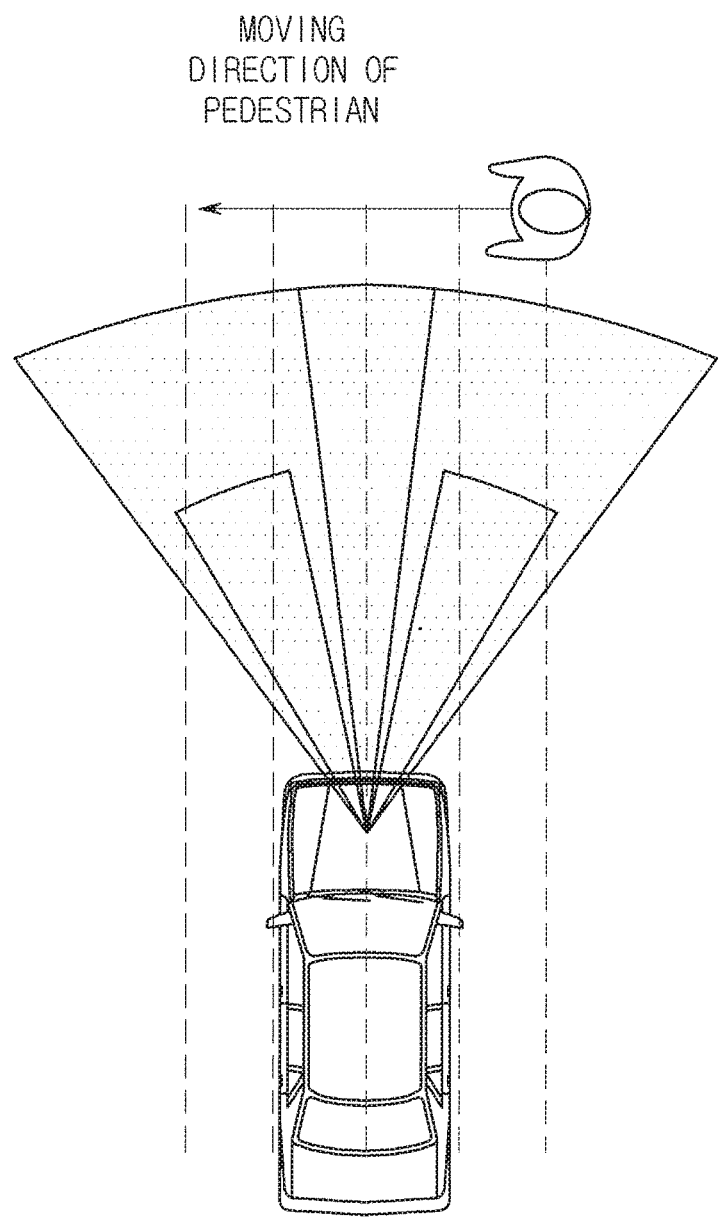

[Fig. 26C]
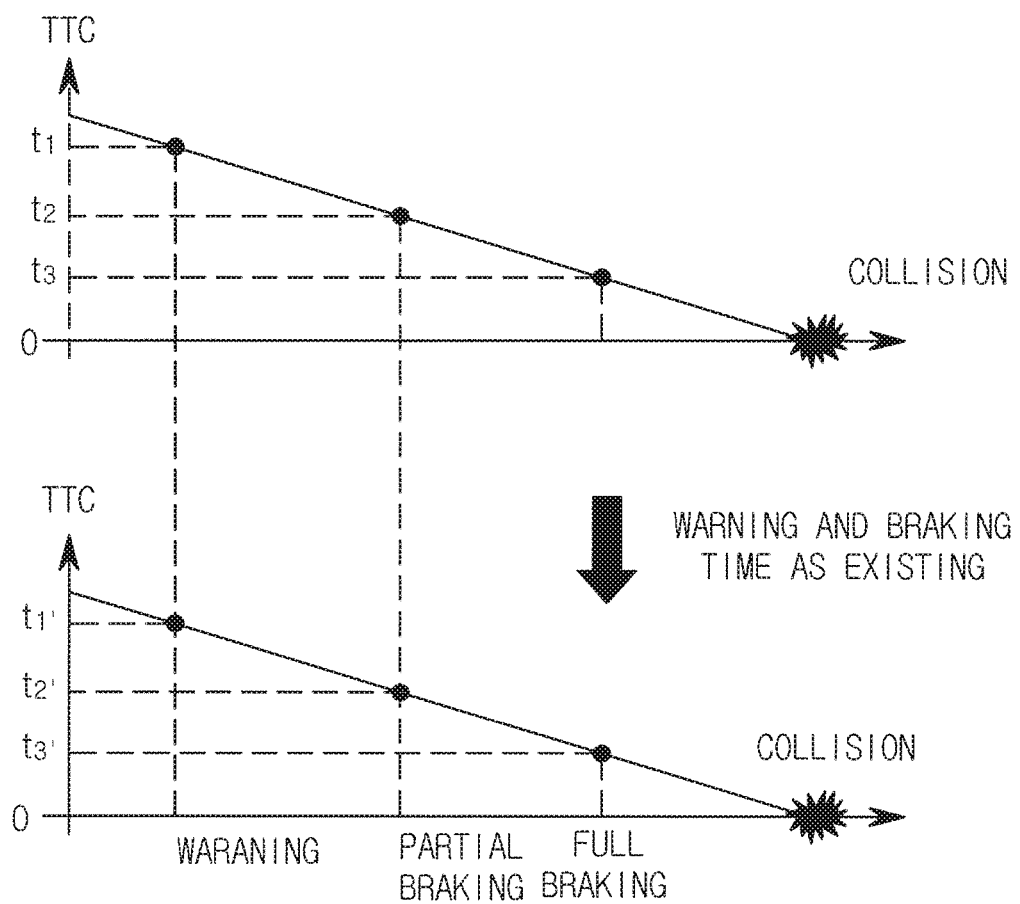

[Fig. 27]
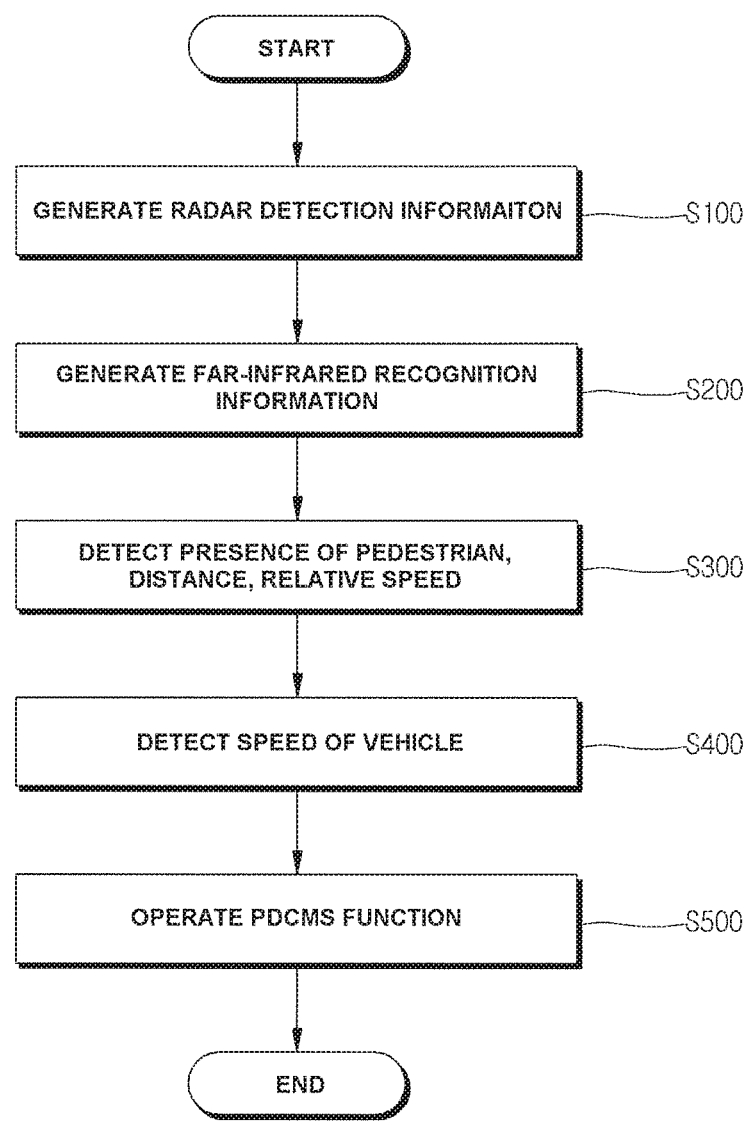

SENSOR INTEGRATION BASED PEDESTRIAN DETECTION AND PEDESTRIAN COLLISION PREVENTION APPARATUS AND METHOD

CROSS-REFERENCE TO RELATED APPLICATION

This application claims the benefits of priority to Korean Patent Application No. 10-2016-0184299, filed on Dec. 30, 2016, the disclosure of which is incorporated herein by reference in its entirety.

BACKGROUND

Technical Field

Exemplary embodiments of the present disclosure relate to a sensor integration based pedestrian detection and pedestrian collision prevention apparatus and method, and more particularly, to an apparatus and a method for activating a Pedestrian Detection and Collision Mitigation Systems (PDCMS) of a vehicle capable of recognizing a pedestrian by allowing a front detection sensor to integrate sensing results from different types of sensors and protecting a pedestrian by activating a PDCMS function when an accident is highly likely to occur by analyzing gaze information of the pedestrian.

Description of the Related Art

Recently, advanced driver assistance systems (ADAS) are being developed to assist driving of a driver. The ADAS has multiple sub-technology categories. Among those, the ADAS includes a PDCMS.

The PDCMS is a technology that warns a driver of a vehicle of a pedestrian collision when a collision of a pedestrian with the vehicle is expected and automatically activates an emergency brake of the vehicle.

Lethality and injury rates of pedestrian-related traffic accidents are so high, which leads to a lot of life loss. The PDCMS system may help reduce a speed of the vehicle against inevitable pedestrian collisions, thereby alleviating pedestrian impacts and reducing the lethality and the injury rates.

Therefore, a technology development for specific application of the PDCMS has been required.

SUMMARY

An object of the present disclosure is to provide an apparatus for activating a PDCMS including a front detection sensor capable of more accurately detecting presence of a pedestrian and measuring a distance and a relative speed between a vehicle and the pedestrian even in a low illuminance condition or at night by integrating sensing results from different types of sensors.

Another object of the present disclosure is to provide a system for more safely protecting a pedestrian by accurately activating a PDCMS function.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an apparatus for activating a pedestrian detection and collision mitigation system (PDCMS) of a vehicle includes: a front detection sensor detecting presence of a pedestrian on a driving lane of the vehicle, gaze information of the pedestrian, and a distance and a relative speed between the pedestrian and the vehicle; a vehicle sensor detecting at least any one of a speed, an acceleration, a steering angle, a steering angular velocity, or a pressure of a master cylinder of the vehicle; an electronic control unit activating a PDCMS function based on information detected by the front detection sensor and the vehicle sensor; and a warning unit operated to inform a driver of a collision of the pedestrian with the vehicle by controlling the electronic control unit, in which the front detection sensor may include: a radar sensor detecting the pedestrian on the driving lane of the vehicle using a radio wave reflected from the pedestrian to generate radar detection information; a far-infrared sensor imaging heat radiated from the pedestrian to generate far-infrared recognition information; and an information integration unit integrating the radar detection information and the far-infrared recognition information, the PDCMS function may include activating an operation of the warning unit and activating an operation of a brake of the vehicle regardless of whether the driver operates the brake, and the activation of the operation of the warning unit and the activation of the operation of the brake may be performed in order of the activation of the operation of the warning unit, a partial braking of the vehicle, and a full braking of the vehicle.

The information integration unit may include: a consistency determination unit calculating a correlation between the radar detection information and the far-infrared recognition information to form a binary matrix; a similarity calculation unit generating a measurement value using the binary matrix formed by the consistency determination unit and calculating similarity in a state variable area between the measurement value and track tracking information of a previous time; a state variable updating unit updating each tracking information by performing Kalman filtering using the measurement value and the state variable; and a tracking information management unit performing merging, generation, and deletion of the track.

The similarity calculation unit may represent longitudinal/lateral relative positions of the radar detection information and the far-infrared recognition information using a polar coordinate system to generate the measurement value.

The state variable updating unit may apply an extended Kalman filter to perform the Kalman filtering.

The front detection sensor may further include a radar detection information post-processing unit removing a result other than the pedestrian among the radar detection information before the integration of the result with the far-infrared recognition information.

The radar detection information may be generated by the number equal to or less than 64.

The far-infrared recognition information may be generated by the number equal to or less than 8.

When a horizontal length of the entire face of the pedestrian is defined as x, a horizontal length from a left face contour to a left eye of the pedestrian is defined as $x_1$, a horizontal length from a right face contour to a right eye of the pedestrian is defined as $x_2$, and a horizontal length between the left eye and the right eye of the pedestrian is defined as $x_3$, the gaze information of the pedestrian may correspond to a front or a diagonal if $|(x_1-x_2)/x|<a$, a rear if $x_1=x_2=x_3=0$, and a side if $|(x_1-x_2)/x|\geq a$ or $x_1=0$ or $x_2=0$, and the a may be selected in a range between 0.65 and 0.95.

The electronic control unit may perform the activation of the operation of the warning unit and the activation of the operation of the brake by delaying the activation of the operation of the warning unit and the activation of the operation of the brake by a predetermined time when the gaze information of the pedestrian is the front or the diagonal, compared to when the gaze information of the pedestrian is the rear or the side.

The vehicle sensor may further include at least any one of a rain sensor, a temperature sensor, and an illumination sensor.

The electronic control unit may perform the activation of the operation of the brake so that the speed of the vehicle is reduced to at least a predetermined speed or more from time when the operation of the brake is activated to time when the collision of the pedestrian with the vehicle occurs.

The electronic control unit may permit the driver to operate the brake for a maximum possible deceleration even after the activation of the operation of the brake starts.

The electronic control unit may control the warning unit to inform the driver that the PDCMS function is in an available state.

The warning unit may include a display unit visually informing the collision of the pedestrian with the vehicle or a speaker unit audibly informing the collision of the pedestrian with the vehicle.

The PDCMS function may further include an operation of a rear brake lamp.

The PDCMS function may further include an operation of an electrical stability control (ESC).

In accordance with another aspect of the present disclosure, a method for activating a pedestrian detection and collision mitigation system (PDCMS) of a vehicle includes: detecting the pedestrian on a driving lane of the vehicle using a radio wave reflected from the pedestrian to generate radar detection information; imaging heat radiated from the pedestrian to generate far-infrared recognition information; integrating the radar detection information with the far-infrared recognition information to detect pedestrian information including presence of the pedestrian on the driving lane of the vehicle, gaze information of the pedestrian, and a distance and a relative speed between the pedestrian and the vehicle; detecting vehicle information including at least any one of a speed, an acceleration, a steering angle, a steering angular velocity, or a pressure of a master cylinder of the vehicle; and activating a PDCMS function based on the pedestrian information and the vehicle information, in which the PDCMS function may include activating an operation of a warning unit operated to inform a driver of the vehicle of a collision of the pedestrian with the vehicle and activating an operation of a brake of the vehicle regardless of whether the driver operates the brake and the activation of the operation of the warning unit and the activation of the operation of the brake may be performed in order of the activation of the operation of the warning unit, a partial braking of the vehicle, and a full braking of the vehicle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a schematic concept of a PDCMS;

FIG. 2 is a block diagram illustrating a change in a PDCMS state according to a vehicle;

FIG. 3 is a block diagram schematically illustrating an apparatus for activating a PDCMS of a vehicle according to an embodiment of the present disclosure;

FIG. 4 is an exemplified view illustrating an AEB VRU scenario;

FIG. 5 is an exemplified view illustrating initial position setting in a CVFA scenario;

FIG. 6 is an exemplified view illustrating a pedestrian speed profile used in a simulation;

FIGS. 7A to 7F are exemplified views illustrating simulation results of a relative distance and a relative angle of a pedestrian;

FIG. 8 is an exemplified view illustrating a distance and speed measurement principle of a radar;

FIG. 9 is an exemplified view illustrating a distance calculation principle in an image using a vanishing point;

FIGS. 10A and 10B are exemplified views illustrating pedestrian recognition of a far-infrared image;

FIG. 11 is an exemplified view illustrating a pedestrian detection using LEDDAR;

FIGS. 12A and 12B are exemplified views illustrating a pedestrian signal using 3D Lidar;

FIG. 13 is an exemplified view illustrating a pedestrian detection using a radar;

FIG. 14 is a configuration diagram of a front detection sensor according to an embodiment of the present disclosure;

FIGS. 15A to 15D are exemplified views illustrating a radar detection information post-processing process of a radar detection information post-processing unit according to an embodiment of the present disclosure;

FIG. 16 is an exemplified diagram illustrating a generation of measurement values by a similarity calculation unit according to an embodiment of the present disclosure;

FIGS. 17A and 17B are exemplified views illustrating a comparison between an integration of longitudinal/lateral relative positions of radar detection information and far-infrared recognition information by a rectangular coordinate system and an integration of longitudinal/lateral relative positions integration of radar detection information and far-infrared recognition information by a polar coordinate system according to an embodiment of the present disclosure;

FIGS. 18A to 18F are exemplified views illustrating an output result of the front detection sensor according to an embodiment of the present disclosure;

FIG. 19 is an exemplified view for identifying gaze information of a front detection sensor according to an embodiment of the present disclosure;

FIG. 20 is a diagram illustrating a concept of a pedestrian moving speed;

FIG. 21 is a diagram illustrating an example of a mapping table for activating a PDCMS function according to the embodiment of the present disclosure;

FIG. 22 is a diagram illustrating an example of the operation of the PDCMS function according to the embodiment of the present disclosure;

FIGS. 23A, 23B and 23C are exemplified views illustrating the operation of the PDCMS function when the gaze information is the front according to the embodiment of the present disclosure;

FIGS. 24A, 24B and 24C are exemplified views illustrating the operation of the PDCMS function when the gaze information is the diagonal according to the embodiment of the present disclosure;

FIGS. 25A, 25B and 25C are exemplified views illustrating the operation of the PDCMS function when the gaze information is the rear according to the embodiment of the present disclosure;

FIGS. 26A, 26B and 26C are exemplified views illustrating the operation of the PDCMS function when the gaze information is the side according to the embodiment of the present disclosure; and FIG. 27 is a flow chart illustrating a flow of a method for activating a PDCMS function according to an embodiment of the present disclosure.

DESCRIPTION OF SPECIFIC EMBODIMENTS

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

Throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

FIG. 1 is a diagram illustrating a schematic concept of a PDCMS.

The PDCMS is a technology that warns a driver of a vehicle of a pedestrian collision when a collision of a pedestrian with the vehicle is expected and automatically activates an emergency brake of the vehicle.

Referring to FIG. 1, it is determined whether the PDCMS is operated based on an operation determination of a pedestrian and an operation determination of a vehicle. When the operation of the PDCMS is determined, the PDCMS function is performed by issuing a warning to driver and activating a vehicle control.

A system designer may design the PDCMS function to operate solely in the risk of collision of a pedestrian with a vehicle or may design the PDCMS function to operate in combination with other driving assistance systems.

FIG. 2 is a block diagram illustrating a change in a PDCMS state according to a vehicle.

In a PDCMS off state, no action is taken on the operation of the vehicle. The PDCMS off state is produced when an engine of a vehicle stalls.

In the PDCMS deactivation state, the apparatus for activating a PDCMS monitors a speed of a vehicle and determine whether the PDCMS is in an appropriate state to activate. The PDCMS deactivation state is produced by turning on the engine in the PDCMS off state. Further, the PDCMS deactivation state is produced even when the vehicle is in a state other than the conditions that the vehicle is activated from the PDCMS activation state. For example, when the speed of the vehicle falls below a predetermined value Vmin, the PDCMS deactivation state is produced.

The PDCMS activation state is produced when the speed of the vehicle is equal to or greater than the predetermined value Vmin and equal to or less than a predetermined value Vmax. To determine whether to operate the PDCMS function in the PDCMS activation state, an operation of a pedestrian and an operation of a vehicle are monitored. When the apparatus for activating a PDCMS determines that the PDCMS function needs to be operated, the PDCMS function starts. The PDCMS function includes a collision warning to a driver and an operation of an emergency brake or optionally includes braking actions by a driver.

FIG. 3 is a block diagram schematically illustrating an apparatus for activating a PDCMS of a vehicle according to an embodiment of the present disclosure.

Referring to FIG. 3, a PDCMS operating apparatus 100 of a vehicle according to an embodiment of the present disclosure includes a front detection sensor 200, a vehicle sensor 300, an electronic control unit 400, and a warning unit 500.

The front detection sensor 200 includes a radar sensor and a far-infrared sensor (which can be in a form of camera) and may integrate and use output results of each of the sensors to more accurately detect a distance and a relative speed between a vehicle and a pedestrian in a low illuminance condition or at night. The front detection sensor 200 may extract characteristics of obstacles detected in front of the vehicle to identify objects and detect various objects such as vehicles on a roadside as well as pedestrians. The front detection sensor 200 may detect even parts configuring a pedestrian as well as the overall appearance of the pedestrian to detect the pedestrian even when only a part of the pedestrian covered by various objects such as vehicles on a roadside is detected. Further, the front detection sensor 200 may detect gaze information of a pedestrian when an object in front of the vehicle is determined as the pedestrian. The front detection sensor 200 transmits the detected information on the pedestrian to the electronic control unit 400.

The vehicle sensor 300 measures revolutions per minute (RPM) of a vehicle wheel from, a vehicle engine and calculates a driving speed of a vehicle based on the known circumference of the wheel and the measured RPM and time. Further, the vehicle sensor 300 may detect information on driving conditions of a vehicle such as acceleration, a steering angle, a steering angular velocity, and a pressure of a master cylinder. Further, the vehicle sensor 300 may also detect information on driving environment of a vehicle by including a rain sensor, a temperature sensor, an illuminance sensor, etc. The vehicle sensor 300 may transmit the information on the detected driving conditions and driving environment of the vehicle to the electronic control unit 400.

The electronic control unit 400 determines whether to operate the PDCMS function of the vehicle based on the information received from the front detection sensor 200 and the vehicle sensor 300. Specifically, the electronic control unit 400 determines whether the conditions that the PDCMS function may be operated are satisfied by combining the pedestrian state and the vehicle state. That is, the electronic control unit 400 determines the risk of collision between a vehicle and a pedestrian using a current position of the pedestrian, a current position of the vehicle, and speed information on the vehicle if it is determined that an obstacle is the pedestrian. For example, if the distance between the pedestrian and the vehicle is below a predetermined distance and the motion direction of the pedestrian is the same as the movement direction of the vehicle, it is determined that the conditions that the PDCMS function may be operated are satisfied because the collision is highly likely to occur and if the distance between the pedestrian and the vehicle is below a predetermined distance but the motion direction of the pedestrian differs from the movement direction of the vehicle, it is determined that the conditions that the PDCMS function may be operated are not satisfied because the collision is less likely to occur.

Preferably, the electronic control unit 400 determines whether the conditions that the PDCMS function may be operated are satisfied based on the mapping table. The mapping table will be described below with reference to FIG. 6.

If the electronic control unit 400 determines that the pedestrian state and the vehicle state satisfy the conditions that the PDCMS function may start, the PDCMS function of the vehicle is operated. The PDCMS function includes operating the warning unit 500 to warn the driver of the collision of the pedestrian with the vehicle or operating the brake without the operation of the driver.

Warning the driver of the collision of the pedestrian with the vehicle is performed by operating the warning unit 500. The warning unit 500 is operated by the control of the electronic control unit 400. The warning unit 500 may include a display unit or a speaker unit. The display unit included in the warning unit 500 may provide a driver with a visual warning through a head-up display, a navigation display, etc. The speaker unit included in the warning unit 500 may provide a driver with an audible warning through an audio. The content of the warning that the warning unit 500 performs is that there is a potential risk of collision of the pedestrian with the vehicle since obstacles exist in the front of a driving lane of the vehicle.

The activation of the operation of the brake regardless of whether the driver operates the brake is performed only by the control of the electronic control unit 400 without the operation of the driver. The activation of the operation of the brake is to automatically reduce the relative speed between the vehicle and the pedestrian if it is found that the pedestrian collision is just around the corner.

The activation of the operation of the brake is performed so that the speed of the vehicle may be reduced to at least a predetermined speed or more from the time when the operation of the brake is activated to the time when the collision of the pedestrian with the vehicle occurs. Preferably, the predetermined speed may be 20 km/h.

Further, even after the activation of the operation of the brake starts, the driver manually operates the brake, thereby performing the maximum possible deceleration. That is, the driver may manually operate the brake so that the speed of the vehicle is reduced more than the predetermined speed. For example, the driver may manually operate the brake so that the speed of the vehicle is maximally decelerated to 20 km/h or more that is the predetermined speed.

In addition, the electronic control unit 400 may inform a driver that the PDCMS function is in an available state. Specifically, the electronic control unit 400 may control the warning unit 500 to inform the driver that the PDCMS function is in the available state through the display unit or the speaker unit of the warning unit 500.

In addition, the PDCMS function may control an operation of a brake lamp to prevent the potential risk of collision with the following vehicles.

In addition, the PDCMS function may further include an operation of an electrical stability control (ESC). The ESC is an apparatus that allows a vehicle itself to intervene in an operation of a brake of the vehicle in an emergency situation such as an oversteer (when a vehicle enters inwardly beyond a turning radius of a road) or an understeer (when a vehicle deviates outwardly beyond the turning radius of the road) of a vehicle to thereby help a driver to escape from an emergency situation.

FIG. 4 is an exemplified view illustrating an AEB VRU scenario.

Prior to describing the detailed configuration of the front detection sensor 200 according to the embodiment of the present disclosure, there is a need to analyze a pedestrian AEB scenario of a new vehicle assessment program (Euro NCAP), which may be the most important application field for understanding the configuration of the front detection sensor 200.

The Euro NCAP sets the pedestrian AEB as a test item by defining the pedestrian AEB as a test item under the name of vulnerable road use (AEB VRU) and describes in detail a test procedure and a scoring method under the name of test protocol In the Euro NCAP test protocol, an appearance of a pedestrian is defined as vehicle to VRU far-side adult (CVFA), vehicle to VRU near-side adult (CVNA), and vehicle to VRU near-side child (CVNC) as illustrated in FIG. 6.

The CVFA is assumed to be a situation in which an adult moves at a speed of 8 km/h to collide with a center of a vehicle, the CVNA is assumed to be a situation in which an adult moves at a speed of 5 km/h to collide with points corresponding to 25% and 75% of a vehicle width, and the CVNC is assumed to be a situation in which a child moves at a speed of 5 km/h between stopped obstacle vehicles to collide with a center of a vehicle.

In each situation, the moving speed of the vehicle is set to be 20 to 60 km/h, and the movement of the vehicle is set to start from time to collision (TTC) that is about 4.0 seconds.

The scoring criterion after AEB braking is changed depends on how much the speed of the vehicle is decelerated from the first moving speed. In order to get a perfect score, the collision need not occur up to 40 km/h and the deceleration needs to be made at a speed higher than that.

For the purpose, setting of a first braking time and a deceleration at the time of the braking time is considered as an important factor, but the present disclosure relates to the pedestrian recognition, and a braking control related algorithm corresponds to one deviating from the scope of the present disclosure. However, for the warning, the first recognition needs to be performed before the warning time. Here, the time corresponds to the TTC of about 2 seconds.

FIG. 5 is an exemplified view illustrating initial position setting in a CVFA scenario.

In the test protocol, the initial position as illustrated in FIG. 5 is set according to the scenario. According to the defined content, since the pedestrian has a constant acceleration section and a first lateral position, the overall motion of the pedestrian is the order of stop, uniformly accelerated motion, and uniform velocity motion.

FIG. 6 is an exemplified view illustrating a pedestrian speed profile used in a simulation.

The time intervals for each motion are a function of a final speed, an initial position, and an acceleration distance. Assuming the pedestrian speed profile as illustrated in FIG. 8, the CVFA has a time interval of 1.075 seconds at t, 0.90 seconds at $t_2$, and 2.025 seconds at $t_3$, the CVNA has a time interval of 1.10 seconds at $t_1$, 0.72 seconds at $t_2$, and 2.16 seconds at $t_3$, and the CVNC has a time interval of 1.10 seconds at $t_1$, 0.72 seconds at $t_2$, and 2.16 seconds at $t_3$.

FIGS. 7A to 7F are exemplified views illustrating simulation results of a relative distance and a relative angle of a pedestrian.

Calculating the relative position and the relative angle by calculating the position of the vehicle and the position of the pedestrian based on the speed profile obtained by the calculation, the results as illustrated in FIG. 9 are obtained. The horizontal axes of each graph are time in msec, and the calculation is performed for a total of 4 seconds from the TTC of 4.0 seconds to the TTC of 0.0 seconds.

That is. FIG. 7A illustrates the result of calculating the relative distance with time of the CVFA, in which the relative distance is uniformly increased depending on the speed of the vehicle, FIG. 7B illustrates the relative angle with time of the CVFA, in which a pedestrian exists at the left of the vehicle and therefore an angle value appears as a negative number. In the beginning, it may be confirmed that an absolute value of the angle increases as the vehicle approaches and then has a constant relative angle when the vehicle enters a uniform velocity section.

FIGS. 7C and 7D may illustrate that the relative angle at the TTC of 0.0 is −90° or 90° as a result of the relative angle in the case of CVNA 25/75, and FIGS. 7E and 7F illustrates the relative distance and the relative angle of the CVNC and the head-on collision situation, and therefore it may be confirmed that the behavior of the CVNC appears as the same as that of the CVFA but is not observed at the beginning due to obstacles and the information thereon appears from the TIC of about 2.0 seconds.

As described above, when a recognition target is calculated based on the TTC of about 2 seconds that is a warning time, it is required to satisfy a maximum recognition distance of 40 m at a vehicle speed of 60 km/h and a maximum recognition angle of 44° at a vehicle speed of 20 km/h.

In order to achieve the pedestrian recognition by satisfying the above-mentioned recognition distance and recognition angle, the AEB pedestrian recognition system needs to include a sensor for pedestrian recognition and may have recognition characteristics according to the applied sensor.

FIG. 8 is an exemplified view illustrating a distance and speed measurement principle of a radar.

For example, the radar uses a method for comparing a received radio wave and a transmitted radio wave to output a distance through a phase difference and output a speed through a frequency change by a Doppler effect. Since two physical quantities of the distance and the speed measured by the radar are all directly obtained from the sensor, a radar sensor is classified into sensors that measure a distance and a speed.

FIG. 9 is an exemplified view illustrating a distance calculation principle in an image using a vanishing point.

In contrast to the radar, a camera needs to calculate a three-dimensional space using the obtained pixel information and calculate a distance using on a camera model or using a correlation between a size and a distance of a pixel unit of a recognized object, and therefore is classified as a sensor of estimating the distance. However, FIG. 9 is one example illustrating the distance calculation principle in the image using the vanishing point, and the distance estimation results may vary depending on internal and external variables of the camera.

In addition, light emitting diode detection and ranging (LEDDAR) or Lidar is a sensor that measures the distance similar to the radar but may not sense the Doppler effect, and therefore performs Bayesian filtering on the data of the measured points to calculate the speed. That is, it may be classified as a sensor that measures a distance and estimates a speed.

A monocular (multi-functional front) camera which is practically currently used has a viewing angle (or horizontal viewing angle) of 52°. When a pedestrian is recognized by using the monocular camera at night, the recognition range is known as 30 m within an irradiation range of a head lamp. On the other hand, it measures the distance and the speed, and therefore has the accuracy slightly lower than that of the distance measurement sensor.

FIGS. 10A and 10B are exemplified views illustrating pedestrian recognition of a far-infrared image.

There is an advantage in that since the far-infrared camera may image heat radiated from a target object to recognize a pedestrian even in a low illuminance condition or an extremely low illuminance condition and recognize a pedestrian up to 50 m that is a relatively long distance. However, the far-infrared camera has a disadvantage in that since the viewing angle is somewhat insufficient as 38° and the resolution is only 1/10 of that of the monocular camera, the estimation accuracy of the distance and the speed is relatively lower than that of the monocular camera.

FIG. 11 is an exemplified view illustrating a pedestrian detection using the LEDDAR.

The LEDDAR sensor has a limit in that since 16 detectors are arranged horizontally and an output is restrictive, it is impossible to recognize a pedestrian and the detection may also be made only in about 20 m.

FIGS. 12A and 12B are exemplified views illustrating a pedestrian signal using 3D Lidar.

The 3D Lidar sensor has a plurality of layers in a vertical direction, and therefore applies vertical/horizontal direction information and a pattern recognition technology in a restrictive situation, thereby recognizing a pedestrian. Specifically, pedestrians within 15 m may be recognized, and pedestrians within 40 m may be detected. Referring to FIGS. 12A and 12B, it may be seen that contour lines are revealed when a large amount of data is collected for two pedestrians, but the amount of data is reduced as the distance is increased and only the data corresponding to one layer appears at a distance of 45 m or more. In this case, since the amount of data decreases as the distance increases, and only data corresponding to one layer is displayed for more than 45 meters. In this case, since the resolutions in both the vertical direction and the horizontal direction are insufficient, the detection is difficult to perform the detection. In addition, the LEDDAR and the 3D Lidar sensor commonly have a disadvantage in that they are greatly affected by a material and a color of the target object because they use a near-infrared wavelength signal.

FIG. 13 is an exemplified view illustrating a pedestrian detection using a radar.

The radar sensor is a sensor that uses a radio wave reflected from an obstacle in front of a vehicle and it may be confirmed that in the case of detecting a pedestrian, a power of a radio wave reflected from a pedestrian is low and therefore a pedestrian may be detected at a distance within 40 m that is a distance shorter than a vehicle. Referring to FIG. 13, it may be seen that the detection probability is somewhat lower than the vehicle according to the surrounding environment. In FIG. 13, the unit of the horizontal axis and the vertical axis is m, and a portion where a discontinuous signal appears corresponds to a phenomenon occurring when a pedestrian is not detected for a predetermined time.

As described with reference to FIGS. 8 to 13, it is impossible for only a single sensor to recognize pedestrians at a level suitable for AEB application in a low illuminance condition or at night. Since the monocular camera is somewhat insufficient in the recognition distance, the far-infrared camera is insufficient in the viewing angle and the distance accuracy, the LEEDAR and the radar sensor may not recognize a pedestrian and therefore is not easy to apply, and the 3D Lidar sensor has a restrictive recognition distance, it is difficult for the single sensor to meet a sensing solution for driving the AEB system.

FIG. 14 is a configuration diagram of the front detection sensor according to an embodiment of the present disclosure.

The front detection sensor 200 according to the embodiment of the present disclosure may solve the above problem and may more accurately recognize a pedestrian even in the low illumination condition or at night by satisfying a recognition distance of 40 m and a horizontal viewing angle of 44°. Specifically, the front detection sensor 200 includes a radar sensor 210 detecting a pedestrian using a radio wave reflected from the pedestrian and generating radar detection information, a far-infrared sensor 220 imaging heat radiated from an object to generate far-infrared recognition information, and an information integration unit 230 integrating the radar detection information and the far-infrared recognition information.

As described above, the radar sensor 210 has features such as a horizontal viewing angle of 90θ, a detection distance of about 40 meters, and an estimation of a distance and a speed that may not be recognized and the far-infrared sensor 220 has features such as a horizontal viewing angle of 38θ, a detection/recognition distance of 50 m, and an estimation of a distance with low accuracy.

The maximum recognition distance is the shorter distance of the detection distance and the recognition distance, but the pedestrian information may be maintained even if the result is output from only one of the two sensors after the first recognition, and therefore the recognition angle becomes the wider horizontal viewing angle of the recognition angle and the detection angle. That is, the radar sensor 210 and the far-infrared sensor 220 of the present disclosure are combined to meet the recognition distance of 40 m and the horizontal viewing angle of 44°.

In order to integrate the output results of two sensors having different characteristics, it is necessary to determine that the two results are generated from one object. According to the embodiment of the present disclosure, the information integration unit 230 integrates the radar detection information generated from the radar sensor 210 and the far-infrared recognition information generated from the far-infrared sensor 220.

Although it is possible to integrate the radar detection information with the far-infrared recognition information, in order to achieve more efficient integration, the present disclosure may include a radar detection information post-processing unit 211 removing the result other than the pedestrian among the radar detection information before the integration of the result with the far-infrared recognition information, prior to integrating each information.

In the case of the pedestrian, the detection by radar restrictively appears because the reflection of the radio wave is relatively low. It may be confirmed that the detection is made only for a predetermined distance and angle or less by the pedestrian detection experiment, and numerical values of the reflected power, the width, etc., among the radar output information appears to be low.

Therefore, the radar detection information post-processing unit 211 previously removes the detection result other than not the pedestrian, based on the experimental data on the condition of the detection distance, the angle, the width, the reflected power, and the like.

FIGS. 15A to 15D are exemplified views illustrating a radar detection information post-processing process of the radar detection information post-processing unit according to an embodiment of the present disclosure. Specifically, it is a result obtained by post-processing a result of detecting a pedestrian moving in a lateral direction in a state where a vehicle equipped with the radar sensor 210 stops.

Values represented on the graph are angle values of each track with time, and FIG. 15A illustrates an initial input value and may confirm that it includes all information of 64 tracks as an initial input value and it is very difficult to observe a certain value. However, in the case of FIG. 15B in which only valid states are left, it may be seen that certain values appear. Since the graph represents an angle value with time, tracks corresponding to straight lines parallel in a horizontal direction may be regarded as an object that is in a stop state even after time lapses and a straight line appearing in a diagonal direction may be regarded as a signal for a pedestrian moving in a lateral direction in which an angle is changed with time FIG. 15C illustrate results after the removal of FIG. 15B on the condition of the distance and the angle and may confirm that a lot of data are reduced and FIG. 15D illustrates results after the removal of the signals of FIG. 15C on the condition of the reflected power and the detection width. Data about a pedestrian appearing diagonally and information about some other objects that are not filtered remain. By the process, more than 90% of the total output from the radar sensor 210 is removed, such that errors of the information integration (combination) performed in the subsequent steps may be reduced.

The information integration unit 230 after the post-processing of the radar detection information post-processing unit 211 (or including the case where there is no post-processing) integrates the radar detection information with the far-infrared recognition information. The information integration unit is configured to include a consistency determination unit 231 calculating a correlation between the radar detection information and the far-infrared recognition information to form a binary matrix, a similarity calculation unit 232 using the binary matrix formed by the consistency determination unit to generate measurement values and calculating similarity in a state variable area between the measurement value and track tracking information, a state variable updating unit 233 performing Kalman filtering using the measurement values and the state variables to update each tracking information, and a tracking information management unit 234 performing merging, generation, and deletion of the track. The description of each configuration will be as follows.

The consistency determination unit 231 calculates a correlation between a maximum of 64 radar detection information and a maximum of 8 far-infrared recognition information to form an 8×64 binary matrix. If the angles and distances at the outputs of each sensor have a difference equal to or less than thresholds of 3 steps that are formed according to the conditions, it is determined that two results are highly likely to result from the same object and thus a matrix value is set to be 1, and otherwise, the matrix value is set to be 0. The determined result serves as a kind of candidate groups transmitted to a step of calculating the similarity between the tracking information and the measurement value.

The similarity calculation unit 232 generates a measurement value to be used in a Kalman filter by integrating the output of the sensor having a value of 1 in the matrix and adds one row and one column so that even the output of the single sensor may generate a filtering result to thereby calculate and use the measurement value generated as the result of the single sensor.

FIG. 16 is an exemplified diagram illustrating a generation of measurement values by a similarity calculation unit according to an embodiment of the present disclosure.

Referring to FIG. 16, the similarity is calculated in the state variable area for the generated measurement value and all the track tracking information at the previous time to connect between a measurement value having maximum similarity and the previous track tracking degree, and matching using GNN is performed to ensure the similarity of the pair of the entire track-measurement value.

In this case, in order to calculate the similarity of the track information, the measurement value to be generated needs to be output to longitudinal/lateral relative positions that are variables that may be compared with the state variable, and the relative positions are values included in the radar detection information and the far-infrared recognition information and therefore the two results need to be integrated.

FIGS. 17A and 17B are exemplified views illustrating a comparison between an integration of longitudinal/lateral relative positions of radar detection information and far-infrared recognition information by a rectangular coordinate system and an integration of longitudinal/lateral relative positions integration of radar detection information and far-infrared recognition information by a polar coordinate system according to an embodiment of the present disclosure. Specifically, according to the embodiment of the present disclosure, the integration of the longitudinal/lateral relative positions is performed by using the polar coordinate system rather than the rectangular coordinate system.

First, FIG. 17A illustrates the case where the longitudinal/lateral relative positions are integrated by using the rectangular coordinate system, and when viewed from the perspective of the reflected errors, errors occurring in the longitudinal direction with respect to the error region of the radar sensor 210 represented by a red ellipse and errors occurring in the lateral direction with respect to the error region of the far-infrared sensor 220 represented a blue ellipse are reflected to the integration result. In this situation, when the target object exists on the front of the vehicle, relatively smaller errors occur, but when the target object exists on the side, the errors in the diagonal direction of the ellipse occur.

In contrast, FIG. 17B illustrates the case where the longitudinal/lateral relative positions are integrated using the polar coordinate system, and it may be confirmed that the small errors occur in both cases where the target object is on the front of the vehicle or on the side thereof. The angles and the distances integrated by the polar coordinate system may be converted into the rectangular coordinate system through a simple trigonometric operation, such that the conversion and the integration as described above in the step of outputting the final measurement value may be a method for generating the smaller errors.

In addition, the state variable updating unit 233 may update each track tracking information by performing the Kalman filtering using the integrated measurement value and the state variable. The present disclosure may also apply an extended Kalman filter is configured to change element values of a state variable transition matrix every time in consideration of the fact that the time at which the time when the output of the far-infrared sensor 220 is generated may be changed depending on the number of candidate groups every time.

Further, the tracking information management unit 234 performs the merging, generation, and deletion of the track.

In the case of the track merging, if the position and speed of the two tracks have the certain similarity, then the later generated track is configured to be merged into the first generated track.

In the case of the track generation, the corresponding track and the radar detection information of the radar sensor 210 are identically generated by being integrated on the polar coordinate system by observing whether there are the results not applied as the measurement values of the track among the outputs of the far-infrared sensor 220 and when the reliability of the far-infrared recognition information is high while the corresponding radar detection information may not be found, the track may be configured to be generated solely.

In the case of the track deletion, the measurement values are not allocated for a predetermined period of time, so that the track is deleted only by the predicted value. Exceptionally, coast tracking is set to be maintained for a longer period time in consideration of that fact that the output of the sensor is difficult to be generated in the approach situation within 5 m. In case of other exceptions, even if the measurement values are allocated each time, when it is determined that the case in which the allocation is continuously made only by the result of the single sensor rather than the integration result is abnormal and deleted, even when the case in which the longitudinal/lateral speed component on the state variable exceeds 15 km/h, the corresponding object is regarded as not being a pedestrian and thus is deleted.

It goes without saying that the above specific conditions may be changed according to the characteristics and purposes of the system to be implemented.

FIGS. 18A to 18F are exemplified views illustrating an output result of the front detection sensor according to an embodiment of the present disclosure.

FIGS. 18A, 18C and 18E illustrate that white dots represent the radar detection information, red dots represent the far-infrared ray recognition information, and a sky blue circle represents the information integration result. Further, FIGS. 18B, 18D and 18F illustrate the information imaged by the far-infrared sensor 220 at the time of the integrating.

As a result, it may be confirmed that the integration result of the relative positions of the pedestrian is outputted normally from the front detection sensor 200.

As a result, the front detection sensor 200 according to the embodiment of the present disclosure includes the radar sensor 210 and the far-infrared sensor 220 in an automatic emergency braking system applied to a vehicle and integrates and uses the results using the polar coordinate system, such that the distance and the relative speed between the vehicle and the pedestrian may be more accurately calculated even in the low illuminance condition or at nighttime.

FIG. 19 is an exemplified view for identifying gaze information of the front detection sensor according to the embodiment of the present disclosure.

The front detection sensor 200 according to the embodiment of the present disclosure may detect the gaze information of the pedestrian and reflect the detected gaze information to the operation of the PDCMS of the electronic control unit 400.

In order to detect the gaze information of the pedestrian, the front detection sensor 200 sets a horizontal length of the entire face of the pedestrian to be x, a horizontal length from a left face contour to a left eye to be x1, a horizontal length from a right face contour to a right eye to be x2, and a horizontal length between the left eye and the right eye to be x3 and then detects the gaze information of the pedestrian.

Specifically, the gaze information of the pedestrian corresponds to the front or the diagonal if $|(x_1-x_2)/x|<a$, the rear if $x_1=x_2=x_3=0$, and the side if $|(x_1-x_2)/x|\geq a$ or $x_1=0$ or $x_2=0$, in which the a may be selected in the range between 0.65 and 0.95.

The front detection sensor 200 transmits the detected gaze information of the pedestrian to the electronic control unit 400. The method for reflecting the gaze information of the pedestrian received by the electronic control unit 400 to the operation of the PDCMS will be described with reference to FIGS. 23 to 26.

FIG. 20 is a diagram illustrating a concept of a pedestrian moving speed.

Referring to FIG. 20, the front detection sensor 200 may detect a distance between a pedestrian 600 and a vehicle 700 that are moving within a driving lane and a moving speed of the pedestrian 600.

For example, if the pedestrian 600 moves from the left to the right with respect to a front view of the vehicle 700, the pedestrian 600 has a negative (−) moving speed and if the pedestrian 600 moves from the right to left with respect to the front view of the vehicle 700, the pedestrian 600 has a positive (+) moving speed.

In addition, the front detection sensor 200 may detect the distance between the vehicle 700 and the pedestrian 600 moving on the driving lane of the vehicle.

FIG. 21 is a diagram illustrating an example of a mapping table for activating a PDCMS function according to the embodiment of the present disclosure.

The electronic control unit 400 uses the mapping table to determine the risk of collision of the pedestrian with the vehicle, and furthermore, whether the PDCMS function is operated.

Referring to FIG. 21, the electronic control unit 400 determines the operation of the PDCMS function based on an initial speed at a boundary of a driving lane on which the pedestrian moves and an initial speed of the vehicle.

Specifically, if an absolute value of the initial speed at the boundary of the driving lane on which the pedestrian is moving and the initial speed of the vehicle are in an area in which the PDCMS function is essentially operated at the time of determining whether the PDCMS function is operated, the electronic control unit 400 determines that the PDCMS function is operated. The operation possible area means the area in which the Vmin or the Vmax may be adjusted according to the selection of the manufacturer.

For example, if the speed of the vehicle falls below 8.4 m/s (30 km/h) as the Vmin or rises above 16.6 m/s (60 km/h) as the Vmax, then the electronic control unit 400 may determine that the PDCMS is in the deactivation state and thus the PDCMS function is not operated.

Further, when the initial speed of the vehicle is between the Vmin and the Vmax and the absolute value of the initial speed at the boundary of the driving lane on which the pedestrian moves is between 0.83 m/s and 1.5 m/s, the electronic control unit 400 may determine that the PDCMS function is operated.

FIG. 22 is a diagram illustrating an example of the operation of the PDCMS function according to the embodiment of the present disclosure. A vertical axis represents the TTC derived from the distance and the relative speed between the vehicle and the pedestrian and a horizontal axis represents the operation of the PDCMS function of the vehicle.

The electronic control unit 400 performs the PDCMS operation by steps according to the distance between the vehicle and the pedestrian.

That is, when $t_1>t_2>t_3$ for $t_1$, $t_2$, and $t_3$ which are different TTCs, if the TTC of the vehicle and the pedestrian is $t_1$, the warning is issued to the driver through the warning unit 500, if the TIC of the vehicle and the pedestrian is $t_2$, the vehicle is partially braked, and if the TTC of the vehicle and the pedestrian is $t_3$, the vehicle is fully braked.

The warning of the warning unit 500 may include the visual warning through the display unit or the audible warning through the speaker unit.

The partial braking means reducing the speed of the vehicle to at least a predetermined speed or more and the full braking means maximally reducing the speed of the vehicle.

However, even after the PDCMS function is operated, the driver may manually operate the brake to perform the maximum possible deceleration. That is, the driver may manually operate the brake to reduce the speed of the vehicle more than the sequential deceleration according to the PDCMS function.

FIGS. 23 to 26 illustrate the method for applying the gaze information of the pedestrian received from the front-side sensor 200 to the operation of the PDCMS function for performing the sequential deceleration of the electronic control unit 400.

When the pedestrian recognizes the driving direction of the vehicle, the pedestrian is less likely to move to the inside of the route of the vehicle is low and the possibility of collision is reduced accordingly. However, when the gaze direction of the pedestrian is not taken into consideration, the gaze of the pedestrian is directed toward the front of the vehicle, and therefore it is likely to activate the warning and the operation of the brake due to the unnecessary operation of the PDCMS function even in the situation that the pedestrian recognizes the driving direction of the vehicle and the possibility of collision is low.

The unnecessary operation of the PDCMS function causes the driver to experience the sense of difference and the discomfort. This is directly connected to the commerciality of the vehicle, which is a big problem for car makers.

Therefore, if the possibility of collision is determined according to the gaze direction of the pedestrian and the operating time of the PDCMS function is controlled, the essential purpose of the PDCMS for protecting the pedestrian may be achieved and the reduction in the ride comfort of the driver may be prevented.

FIGS. 23A, 23B and 23C are exemplified views illustrating the operation of the PDCMS function when the gaze information is the front according to the embodiment of the present disclosure.

As described above with reference to FIG. 19, the horizontal length of the entire face of the pedestrian is x, the horizontal length from the left face contour to the left eye is defined as $x_1$, the horizontal length from the right face contour to the right eye is defined as $x_2$, the horizontal length between the left eye and the right eye is defined as $x_3$.

If the gaze of the pedestrian is directed toward the front of the vehicle, it corresponds to the case where $|(x_1-x_2)/x|<a$. Therefore, if it corresponds to $|(x_1-x_2)/x|<a$ based on the lengths of each part of the face of the pedestrian derived from the front detection sensor 200, it may be determined that the gaze of the pedestrian is directed toward the front of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 22 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 22 during the operating time of the PDCMS function.

FIGS. 24A, 24B and 24C are exemplified views illustrating the operation of the PDCMS function when the gaze information is the diagonal according to the embodiment of the present disclosure.

If the gaze of the pedestrian is directed toward the diagonal of the vehicle, it corresponds to the case where $|(x_1-x_2)/x|<a$ like the case where the gaze of the pedestrian is the front of the vehicle. Therefore, if the gaze of the pedestrian corresponds to $|(x_1-x_2)/x|<a$ based on the lengths of each part of the face of the pedestrian derived from the front detection sensor 200, it may be determined that the gaze of the pedestrian is directed toward the diagonal of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 22 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 22 during the operating time of the PDCMS function.

FIGS. 25A, 25B and 25C are exemplified views illustrating the operation of the PDCMS function when the gaze information is the rear according to the embodiment of the present disclosure.

If the gaze direction of the pedestrian is in the same direction as the driving direction of the vehicle, that is, if the vehicle is driving toward the rear of the pedestrian, it corresponds to $x_1=x_2=x_3=0$. Therefore, if it corresponds to $|(x_1-x_2)/x|<a$ based on the lengths of each part of the face of the pedestrian derived from the front detection sensor 200, it may be determined that the gaze direction of the pedestrian is the same as the driving direction of the vehicle, that is, the vehicle is driving toward the rear of the vehicle.

In this case, since the vehicle exists within the view of the pedestrian, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 22.

FIGS. 26A, 26B and 26C are exemplified views illustrating the operation of the PDCMS function when the gaze information is the side according to the embodiment of the present disclosure.

If the gaze direction of the pedestrian forms about 90° with respect to the driving direction of the vehicle, that is, if the vehicle is driving toward the side of the pedestrian, it corresponds to the case where $|(x_1-x_2)/x| \geq a$ or $x_1=0$ or $x_2=0$. Therefore, if it corresponds to $|(x_1-x_2)/x| \geq a$ or $x_1=0$ or $x_2=0$ based on the lengths of each part of the face of the pedestrian derived from the front detection sensor 200, it may be determined that the gaze direction of the pedestrian forms about 90° with respect to the driving direction of the vehicle, that is, the vehicle is driving toward the side of the vehicle.

In this case, since the possibility that the vehicle does not exist within the view of the pedestrian is significant, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 22.

FIG. 27 is a flow chart illustrating a flow of a method for activating a PDCMS function according to an embodiment of the present disclosure.

Referring to FIG. 27, a method for activating a pedestrian detection and collision mitigation system (PDCMS) function of a vehicle according to an embodiment of the present disclosure includes: generating radar detection information by detecting a pedestrian on a driving lane of a vehicle using a radio wave reflected from a pedestrian (S100); generating far-infrared recognition information by imaging heat radiated from the pedestrian (S200); detecting pedestrian information including presence of the pedestrian on a driving lane of the vehicle, gaze information of the pedestrian, and a distance and a relative speed between the pedestrian and the vehicle by integrating the radar detection information with the far-infrared recognition information (S300); detecting vehicle information including at least any one of a speed, an acceleration, a steering angle, a steering angular velocity, and a pressure of a master cylinder of the vehicle (S400); and activating a PDCMS function based on the pedestrian information and the vehicle information (S500).

In the generating of the radar detection information by detecting the pedestrian on the driving lane of the vehicle using the radio wave reflected from the pedestrian (S100), the heat radiated by the target object may be imaged and therefore the pedestrian may be recognized even in the low illumination or extremely low illumination condition.

In the generating of the far-infrared ray recognition information by imaging the heat radiated by the pedestrian (S200), the heat radiated by the target object is imaged and therefore the pedestrian may be recognized even in the low illumination or extremely low illuminance condition.

In the detecting of the pedestrian information including the presence of the pedestrian on the driving lane of the vehicle and the distance and the relative speed between the pedestrian and the vehicle by integrating the radar detection information with the far-infrared recognition information (S300), it is possible to more accurately detect the distance and the relative speed between the vehicle and the pedestrian even in the low illuminance condition or at night.

In the detecting of the vehicle information including at least any one of the speed, the acceleration, the steering angle, the steering angular velocity and the pressure of the master cylinder of the vehicle (S400), the RPM of the vehicle wheel from the vehicle engine is measured and the driving speed of the vehicle is calculated based on the known circumference of the wheel and the measured RPM and time. Further, the vehicle sensor 300 may detect the information on the driving conditions of the vehicle such as the acceleration, the steering angle, the steering angular velocity, the pressure of the master cylinder, and the like.

In the operating of the PDCMS function based on the pedestrian information and the vehicle information (S500), it is determined whether to operate the PDCMS function of the vehicle based on the mapping table using the acquired pedestrian information and pedestrian information. Specifically, it is determined whether the conditions that the PDCMS function on the mapping table may be operated are satisfied based on the integration of the pedestrian information and the vehicle information. That is, the risk of collision of the pedestrian with the vehicle is determined on the mapping table using the current position of the pedestrian, the current position of the vehicle, and the speed information of the vehicle.

Further, in the operating of the PDCMS function based on the pedestrian information and the vehicle information (S500), the PDCMS function of the vehicle is operated if it is determined that the pedestrian state and the vehicle state satisfy the conditions that the PDCMS function may start on the mapping table. The PDCMS function includes the activation of the operation of the warning unit that is operated to inform the driver of the collision of the pedestrian with the vehicle and the operation of the brake regardless of whether the driver operates the brake. Further, the activation of the operation of the warning unit and the activation of the operation of the brake are performed in order of the activation of the operation of the warning unit, the partial braking of the vehicle, and the full braking of the vehicle.

Meanwhile, it should be understood that the PDCMS was described as an example for convenience of description in the present specification. As described above, it should be understood that the PDCMS is only one of several ADAS functions, and that the PDCMS implementations presented by the present disclosure may also be used to implement other ADAS functions involved. For example, the system presented by the present disclosure may be applied to implement one or a combination of ones of the ADAS functions such as the PDCMS, a lane change decision aid system (LCDAS), a land departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), and low speed following (LSF).

The apparatus for activating a PDCMS of a vehicle according to the embodiment of the present disclosure may include different types of sensors and may integrate and use the respective sensing results to more accurately detect the presence of the pedestrian and the distance and the relative speed between the vehicle and the pedestrian even in the low illuminance condition and at night.

In addition, the embodiment of the present disclosure may classify the gaze of the pedestrian into the front, the diagonal, the rear, and the side to identify whether the pedestrian may recognize the vehicle or not and then apply the identified situation to the operation of the PDCMS, such that the vehicle braking control may be delayed by the predetermined time only when the pedestrian may recognize the vehicle.

Therefore, the apparatus for activating a PDCMS according to the embodiment of the present disclosure may more accurately detect the pedestrian to effectively protect the pedestrian and optimize the vehicle braking control unnecessarily frequently performed to resolve the sense of difference and discomfort of the driver, thereby improving the commerciality of the vehicle.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims. Moreover, in connection with the extent that the term "include" in the detailed description or the appended claims is used, the term are intended to be inclusive in a manner similar to "consisting" as interpreted when the term "configured" is used as a transitional word in the appended claim.

What is claimed is:

1. An apparatus for activating a pedestrian detection and collision mitigation system (PDCMS) of a vehicle, comprising:
   a front detection sensor detecting presence of a pedestrian on a driving lane of the vehicle, gaze information of the pedestrian, and a distance and a relative speed between the pedestrian and the vehicle;
   a vehicle sensor detecting at least one of a speed, an acceleration, a steering angle, a steering angular velocity, or a pressure of a master cylinder of the vehicle;
   an electronic control unit activating a function of the PDCMS when a collision of the pedestrian with the vehicle is expected based on information detected by the front detection sensor and the vehicle sensor; and
   a warning unit providing a driver with a warning of the collision of the pedestrian with the vehicle,
   wherein the front detection sensor includes:

a radar sensor detecting the pedestrian on the driving lane of the vehicle using a radio wave reflected from the pedestrian to generate radar detection information, and determining a moving speed of the pedestrian based on the relative speed between the pedestrian and the speed of the vehicle;

a far-infrared sensor imaging heat radiated from the pedestrian to generate far-infrared recognition information; and a processor integrating the radar detection information and the far-infrared recognition information, wherein the function of the PDCMS includes an operation of the warning unit and an operation of a brake of the vehicle regardless of whether the driver operates the brake, wherein the operation of the warning unit and the operation of the brake are performed in order of the operation of the warning unit, a partial braking of the vehicle, and a full braking of the vehicle, and wherein the electronic control unit is configured to determine that the function of the PDCMS is operated, if a speed of the vehicle is within a first speed range and the moving speed of the pedestrian on a driving lane is within a second speed range.

2. The apparatus of claim 1, wherein the processor is further configured to:
calculate a correlation between the radar detection information and the far-infrared recognition information to form a binary matrix;
generate a measurement value using the binary matrix and calculate similarity in a state variable area between the measurement value and track tracking information of a previous time;
update each tracking information by performing Kalman filtering using the measurement value and the state variable; and
perform merging, generation, and deletion of the track.

3. The apparatus of claim 2, wherein the processor is further configured to represent longitudinal/lateral relative positions of the radar detection information and the far-infrared recognition information using a polar coordinate system to generate the measurement value.

4. The apparatus of claim 2, wherein the processor is further configured to apply an extended Kalman filter to perform the Kalman filtering.

5. The apparatus of claim 1, wherein the processor is further configured to remove a result other than the pedestrian among the radar detection information before the integration of the result with the far-infrared recognition information.

6. The apparatus of claim 1, wherein the radar detection information is generated 64 times or less.

7. The apparatus of claim 1, wherein the far-infrared recognition information is generated 8 times or less.

8. The apparatus of claim 1, wherein when a horizontal length of an entire face of the pedestrian is defined as x, a horizontal length from a left face contour to a left eye of the pedestrian is defined as $x_1$, a horizontal length from a right face contour to a right eye of the pedestrian is defined as $x_2$, and a horizontal length between the left eye and the right eye of the pedestrian is defined as $x_3$, the gaze information of the pedestrian corresponds to a front or a diagonal if $|(x_1-x_2)/x|<a$, a rear if $x_1=x_2=x_3=0$, aside if $|(x_1-x_2)/x|\geq x_1=0$ or $x_2=0$, and a is selected in a range between 0.65 and 0.95.

9. The apparatus of claim 8, wherein the electronic control unit performs the operation of the warning unit and the operation of the brake by delaying the operation of the warning unit and the operation of the brake by a predetermined time when the gaze information of the pedestrian is the front or the diagonal, compared to when the gaze information of the pedestrian is the rear or the side.

10. The apparatus of claim 1, wherein the vehicle sensor further includes at least one of a rain sensor, a temperature sensor, and an illumination sensor.

11. The apparatus of claim 1, wherein the electronic control unit performs the operation of the brake so that the speed of the vehicle is reduced to at least a predetermined speed or more from time when the operation of the brake is operated to a time point when the collision of the pedestrian with the vehicle occurs.

12. The apparatus of claim 1, wherein the electronic control unit permits the driver to operate the brake for a maximum possible deceleration even after the operation of the brake starts.

13. The apparatus of claim 1, wherein the electronic control unit controls the warning unit to inform the driver that the PDCMS function is in an available state.

14. The apparatus of claim 1, wherein the warning unit includes a display visually providing the driver with the warning of the collision of the pedestrian with the vehicle or a speaker audibly providing the driver with the warning of the collision of the pedestrian with the vehicle.

15. The apparatus of claim 1, wherein the PDCMS function further includes an operation of a rear brake lamp.

16. The apparatus of claim 1, wherein the PDCMS function further includes an operation of an electrical stability control (ESC).

17. A method for activating a pedestrian detection and collision mitigation system (PDCMS) of a vehicle, comprising:
detecting a pedestrian on a driving lane of the vehicle using a radio wave reflected from the pedestrian to generate radar detection information;
imaging heat radiated from the pedestrian to generate far-infrared recognition information;
integrating the radar detection information with the far-infrared recognition information to detect pedestrian information including presence of the pedestrian on the driving lane of the vehicle, gaze information of the pedestrian, and a distance and a relative speed between the pedestrian and the vehicle;
detecting vehicle information including at least any one of a speed, an acceleration, a steering angle, a steering angular velocity, or a pressure of a master cylinder of the vehicle;
determining a moving speed of the pedestrian based on the relative speed between the pedestrian and the speed of the vehicle; and
activating a PDCMS function when a collision of the pedestrian with the vehicle is expected based on the pedestrian information and the vehicle information,
wherein the PDCMS function includes an operation of a warning unit operated to provide a driver with a warning of the collision of the pedestrian with the vehicle and an operation of a brake of the vehicle regardless of whether the driver operates the brake,
wherein the operation of the warning unit and the operation of the brake are performed in order of the operation of the warning unit, a partial braking of the vehicle, and a full braking of the vehicle, and
wherein the method further includes determining that the function of PDCMS is operated, if a speed of the vehicle is within a first speed range and the moving speed of the pedestrian on a driving lane is within a second speed range.

\* \* \* \* \*